(12) United States Patent
Cai et al.

(10) Patent No.: US 9,509,192 B1
(45) Date of Patent: Nov. 29, 2016

(54) DYNAMIC SYSTEM FOR GENERATING ELECTRICITY

(71) Applicants: Bocheng Cai, Shanghai (CN); Eddie Jinghua Wang, Palo Alto, CA (US); Wencen Zou, Chongqing (CN); Timothy Ding, Pleasanton, CA (US); Rebecca Li, San Carlos, CA (US)

(72) Inventors: Bocheng Cai, Shanghai (CN); Eddie Jinghua Wang, Palo Alto, CA (US); Wencen Zou, Chongqing (CN); Timothy Ding, Pleasanton, CA (US); Rebecca Li, San Carlos, CA (US)

( * ) Notice: Subject to any disclaimer, the term of this patent is extended or adjusted under 35 U.S.C. 154(b) by 0 days.

(21) Appl. No.: 15/173,717

(22) Filed: Jun. 6, 2016

Related U.S. Application Data

(63) Continuation of application No. 14/936,628, filed on Nov. 9, 2015, now abandoned.

(60) Provisional application No. 62/218,694, filed on Sep. 15, 2015.

(51) Int. Cl.
| | |
|---|---|
| *H02K 7/02* | (2006.01) |
| *H02K 3/28* | (2006.01) |
| *H02K 11/00* | (2016.01) |
| *H02K 53/00* | (2006.01) |

(52) U.S. Cl.
CPC ...... *H02K 7/02* (2013.01); *H02K 3/28* (2013.01); *H02K 11/0094* (2013.01); *H02K 53/00* (2013.01); *Y10S 74/09* (2013.01)

(58) Field of Classification Search
CPC .... H02K 7/02; H02K 7/1869; H02K 7/1876; H02K 3/28; H02K 11/0094; H02K 53/00; Y10S 74/09
USPC ............... 310/74, 75 R, 79, 80, 81, 75 A
See application file for complete search history.

(56) References Cited

U.S. PATENT DOCUMENTS 4,284,983 A * 8/1981 Lent ............... G08B 13/1409
340/522

\* cited by examiner

*Primary Examiner* — Michael Andrews
(74) *Attorney, Agent, or Firm* — Jingming (James) Cai; SAC Attorneys LLP

(57) ABSTRACT

A dynamic system for generating electricity from a changing magnetic field includes solenoids routed on a single iron core, switches, and diodes. A first solenoid and a second solenoid are stationary electromagnet coils opposably routed on the iron core. A third solenoid is a stationary electric current induction coil. The first and second solenoids induce opposing magnetic fields on receiving an initial magnetizing current from a solar cell. One of the switches includes a switching system that alternately connects at least one switching node, for example, via one or more pivot joints, to one of at least two contact nodes to form a closed electric system with the first solenoid or the second solenoid, the solar cell, and a load and to change the induced magnetic field in the first solenoid or the second solenoid. The changing magnetic field induces an electric current in the third solenoid.

20 Claims, 32 Drawing Sheets

DYNAMIC SYSTEM FOR GENERATING ELECTRICITY

CROSS-REFERENCE TO RELATED APPLICATIONS

This application claims priority to and the benefit of provisional patent application No. 62/218,694 titled "Dynamic System To Convert Motion To Electricity", filed in the United States Patent and Trademark Office on Sep. 15, 2015. This application is a continuation application of non-provisional patent application Ser. No. 14/936,628 titled "Dynamic System To Convert Motion To Electricity", filed on Nov. 9, 2015 in United States Patent and Trademark Office.

The specification and drawings of the above referenced patent applications are herein incorporated by reference in their entirety.

BACKGROUND

In an era that emphasizes green technology, there is a need for finding new ways to save and reuse energy, while also making it affordable to do so. Energy harvesting refers to a process of capturing energy from external sources comprising, for example, sunlight, thermal energy, wind, kinetic energy, hydraulics, etc. Energy that is harvested from different sources is typically bountiful, and is present regardless of whether energy harvesting takes place. The harvested energy is typically converted to electricity to power electronic devices, for example, wireless autonomous devices used in wearable electronics and wireless sensor networks. Since energy harvesting does not depend on batteries or power sockets, the harvested energy is used as a power source in multiple different industries and for powering portable electronic devices. For example, users can use the harvested energy to charge portable electronic devices such as smartphones without the need for connecting their smartphones to a power socket, thereby allowing the users to charge their smartphones on the go. Other devices, for example, communication radios and flashlights can also benefit from energy harvesting technologies in locations such as underground mines, deserts, and remote areas, where power sources are unavailable.

Conventional generators produce electricity from random, ambient vibrations to power a device, for example, a wristwatch, a pacemaker, or a wireless sensor. Some energy harvesting devices generate renewable electric power from arbitrary, non-periodic vibrations. Non-periodic vibrations are obtained, for example, from traffic driving on bridges, machinery operating in industries, and humans moving their limbs. In a research experiment, a generator that harnesses energy from nearby vibrations using piezoelectric materials was created. The piezoelectric materials create a charge when stressed. The piezoelectric materials allow each generator of one cubic centimeter in volume to generate a power of, for example, about 0.5 milliwatts, which can potentially be used to drive small autonomous devices, for example, pacemakers. The conventional energy harvesting systems that use piezoelectric materials generate insufficient power to power a standard portable electronic device. Moreover, the piezoelectric materials are expensive. In another research experiment, vibration-to-electricity converters that use microelectromechanical systems (MEMS) fabrication technology with an output power density of, for example, about 116 $\mu W/cm^3$ were designed. However, the MEMS based energy harvester system is expensive and generates low power.

Another conventional energy harvester system uses micro-electrostatic vibrations to generate electricity. The reduction in size and power consumption of complementary metal-oxide semiconductor (CMOS) circuitry has led to research based on wireless sensor networks. Proposed networks comprise thousands of small wireless nodes that operate in a multi-hop fashion, replacing long transmission distances with multiple low power and low cost wireless devices. The result is a creation of an environment that responds to its inhabitants and ambient conditions. Wireless devices being designed and built for use in such an environment typically run on batteries. However, as the networks increase in number and the devices decrease in size, the replacement of depleted batteries is not practical. The cost of replacing batteries in a few devices that make up a small network about once a year is feasible. However, the cost of replacing batteries in thousands of devices annually, some of which are in areas difficult to access, is not practical. Another approach would be to use a battery that is large enough to last the entire lifetime of a wireless sensor device. However, a battery large enough to last the lifetime of the wireless sensor device would dominate the overall system size and cost, and thus is not practical. There is a need for alternative methods of powering devices that make up wireless networks.

In another experimental research study, a brushless direct current (BLDC) motor was created. The BLDC motor is a robust machine which has applications over a wide range of power and speed in different shapes and geometry. The BLDC motor or generator consists of two magnetically dependent stator and rotor sets or layers, where each stator set comprises nine salient poles with windings wrapped around them, while the rotor comprises six salient poles. A magnetic field passes through a guide to the rotor, then to the stator, and finally completes its path via a housing of the BLDC motor. This is a three phase motor or a three phase generator and every stator and rotor pole arc is about 30°. In this research study, a power electronic converter was also presented. This topology provides bidirectional control of a current for each motor phase independently. A control scheme permits the BLDC motor to operate with any number of phases at any time. In this converter, four power switches in the form of a bridge connection for each motor phase was utilized and therefore, the BLDC motor was operated by switching different sequences for the current direction in each motor phase winding. This converter also offers a choice of having any number of phases to be activated at any time. A prototype motor or generator and a drive circuit were built and tested in a laboratory and the numerical and experimental results were presented. Due to the ruggedness of the proposed motor or generator in comparison with the conventional and BLDC motors used for automobile applications, the proposed motor or generator was applicable for use as an integrated motor generator for a hybrid vehicle.

Another research study provided possible strategies to increase an operational frequency range for vibration based micro-generators. Most vibration based micro-generators are spring-mass-damper systems that generate maximum power when a resonant frequency of the vibration based micro-generator matches a frequency of an ambient vibration. Any difference between these two frequencies results in a significant decrease in the generated power, which restricts the capability of resonant vibration generators in real applications. Possible solutions comprise, for example, periodic tuning of the resonant frequency of the generator to match the frequency of the ambient vibration at all times or widening the bandwidth of the generator. Periodic tuning is achieved using mechanical or electrical methods. Bandwidth widening is achieved, for example, using a generator array, a mechanical stopper, nonlinear or magnetic springs, or bi-stable structures. Tuning methods are classified into intermittent tuning and continuous tuning. In the intermittent tuning method, power is consumed periodically to tune the generator. This scenario presents a comprehensive review of principles and operating strategies for increasing the operating frequency range of vibration based micro-generators.

Energy harvesting generators are typically used as inexhaustible replacements for batteries in low power wireless electronic devices. Ambient motion is one of the main sources of energy for harvesting, and a wide range of motion powered energy harvesters are proposed or demonstrated. Another conventional energy harvester system generates electricity from mechanical energy. Ambient mechanical vibrations move a magnet which is attached to a harvester frame. A moving magnetic field induces an electromotive force in a coil placed outside of the harvester frame. The energy harvester system generates electrical power of up to a few milliwatts. Most energy harvester systems utilize expensive materials, for example, piezoelectric materials to generate electricity. Moreover, the power generated by these energy harvester systems is, for example, about 50 milliwatts to about 100 milliwatts, which is not sufficient to power smartphones or other portable devices.

The harvested energy from different energy harvesting systems such as those discussed above is often used to drive an alternating current (AC) generator to produce electricity. Most generators used in industries employ two coils, where one coil is used as an electromagnet and the other coil is used for inducing an electric current. That is, one of the coils spins and the other coil remains stationary. The conventional AC generators have either a rotating electromagnet or a rotating coil. As a result, the two coils, that is, the coil of the electromagnet and the coil of current induction cannot share the same iron core and the magnetic field generated by the coil of the electromagnet can only partially travel to the other coil for the induction of electric current. A major portion of the magnetomotive force used to induce the magnet field is thus wasted. Because the two coils cannot share the same iron core, the induced magnetic field has to pass through air to enter the other iron core, losing strength in the process. The induced magnetic field by the coil of the electromagnet cannot entirely travel to the coil of current induction to induce electric current and as such, the electromagnet has to produce a stronger magnetic field by using more magnetizing current.

Hence, there is a long felt but unresolved need for a dynamic system that generates electricity from a changing magnetic field. Moreover, there is a need for a dynamic system that uses only one iron core for both the coil of the electromagnet and the coil of current induction, where both the coils are stationary and the changing magnetic field is created by turning on/off the magnetizing current.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended to determine the scope of the claimed subject matter.

The dynamic system disclosed herein addresses the above stated need for generating electricity from a changing magnetic field. The dynamic system disclosed herein uses a single iron core for electromagnet coils and an electric current induction coil, where the coils are stationary and the changing magnetic field is created by turning on/off a magnetizing current. The energy for turning on/off the magnetizing current is obtained, for example, from harvesting mechanical energy or motion energy. The electromagnet coils and the electric current induction coil are stationary and can share a single iron core, resulting in high magnetization efficiency. The changing magnetic field is produced by alternating the magnetizing current between two oppositely facing solenoids. The energy for alternating the magnetizing current is obtained from a built-in energy harvester.

The dynamic system for generating electricity from a changing magnetic field disclosed herein comprises solenoids and switches. The solenoids of the dynamic system disclosed herein are routed on a single iron core. In an embodiment, the solenoids comprise a first solenoid, a second solenoid, and a third solenoid. The first solenoid and the second solenoid are stationary electromagnet coils opposably routed on the single iron core. The first solenoid and the second solenoid induce opposing magnetic fields one after the other on receiving an initial magnetizing current from a solar cell. The solar cell is electrically connected to the solenoids in an electric system. The third solenoid is a stationary electric current induction coil routed on the same iron core.

The switches of the dynamic system disclosed herein are operably connected to the solenoids in the electric system. In an embodiment, the switches comprise a first switch and a second switching system. The first switch is operably connected to the solar cell and a resistor in the electric system. The first switch disconnects from the solar cell and connects to the resistor after the initial magnetizing current is supplied to the first solenoid and the second solenoid. The second switching system alternately connects at least one switching node to one of at least two contact nodes in the electric system to form a closed electric system with the first solenoid or the second solenoid, the solar cell, and a load. The alternate connection of at least one switching node of the second switching system to one of at least two contact nodes changes a magnetic field induced in the first solenoid or the second solenoid by alternating the initial magnetizing current between the first solenoid and the second solenoid. The changing magnetic field induces an electric current, for example, an alternating current in the third solenoid.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods, components, and structures disclosed herein. The description of a method step or a component or a structure referenced by a numeral in a drawing is applicable to the description of that method step or component or structure shown by that same numeral in any subsequent drawing herein.

DETAILED DESCRIPTION OF THE INVENTION

Figure 1:
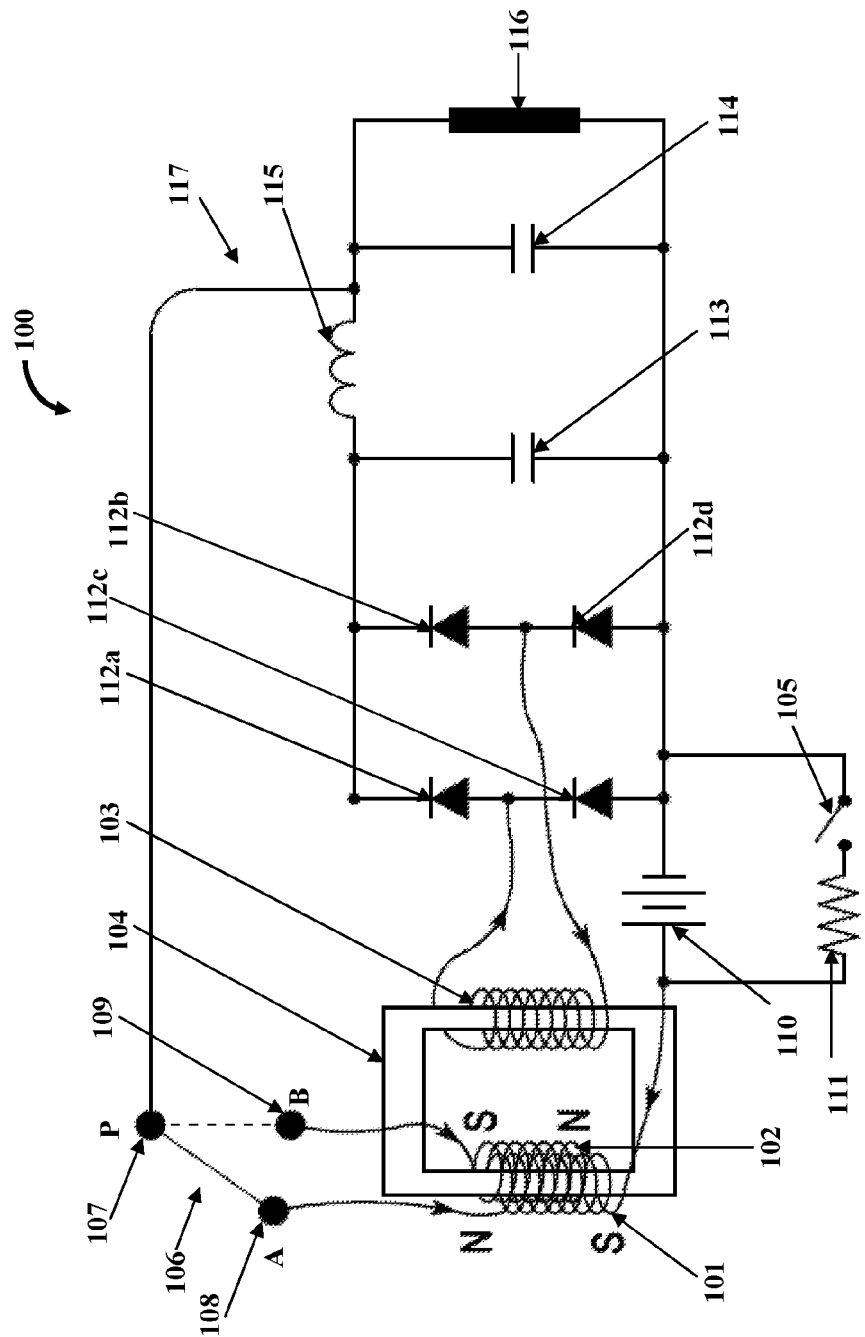
FIG. 1 illustrates a dynamic system for generating electricity from a changing magnetic field, showing solenoids, a first switch, and a second switching system.

FIG. 1 illustrates a dynamic system 100 for generating electricity from a changing magnetic field, showing solenoids 101, 102, and 103, a first switch 105, and a second switching system 106. The dynamic system 100 disclosed herein comprises multiple solenoids 101, 102, and 103 and switches 105 and 106 operably coupled to the solenoids 101, 102, and 103 in an electric system 117. In an embodiment as exemplarily illustrated in FIG. 1, the solenoids comprise the first solenoid 101, the second solenoid 102, and the third solenoid 103 made of, for example, 30 magnet (MAG) coated wires. The MAG coated wires are, for example, copper or aluminum wires coated with a thin layer of insulation. The wires of the first solenoid 101 and the second solenoid 102 are routed in opposing directions for inducing opposing magnetic fields in the first solenoid 101 and the second solenoid 102. The first solenoid 101, the second solenoid 102, and the third solenoid 103 are routed on a single iron core 104. In an embodiment, the single iron core 104 is configured, for example, in a toroid shape without an air gap to provide a magnetic path of least magnetic resistance. In an embodiment, the single iron core 104 is divided into three sections for accommodating the first solenoid 101, the second solenoid 102, and the third solenoid 103.

In an embodiment, the first solenoid 101 and the second solenoid 102 of the dynamic system 100 are used as electromagnets, while the third solenoid 103 is used for induction of electric current. The first solenoid 101 and the second solenoid 102 are stationary electromagnet coils opposably routed on the same iron core 104. The first solenoid 101 and the second solenoid 102 induce opposing magnetic fields one after the other on receiving an initial magnetizing current from a solar cell 110. The solar cell 110 provides an initial magnetizing current to the first solenoid 101 or the second solenoid 102 to induce the magnetic field. The solar cell 110 is electrically connected to the first solenoid 101 and the second solenoid 102 in the electric system 117. The source of the initial magnetizing current, for example, the solar cell 110, is connected to a capacitor 113 in the electric system 117 when a predefined amount of charge is generated on the capacitor 113. The third solenoid 103 is a stationary electric current induction coil routed on the same iron core 104.

In an embodiment as exemplarily illustrated in FIG. 1, the switches of the dynamic system 100 disclosed herein comprise a first switch 105 and a second switching system 106. The first switch 105 and the second switching system 106 are operably connected to the first solenoid 101, the second solenoid 102, and the third solenoid 103 in the electric system 117. In an embodiment, the dynamic system 100 further comprises a control system 119 as exemplarily illustrated in FIG. 14 and FIGS. 15A-15B. The control system 119 is operably connected to the first switch 105 and the second switching system 106 for controlling the first switch 105 and the second switching system 106 that affect the induced magnetic field in the first solenoid 101 and the second solenoid 102 and the induced electric current in the third solenoid 103. The first switch 105 is operably connected to the solar cell 110 and a resistor 111 in the electric system 117. The first switch 105 can be in an open position or a closed position. When the first switch 105 is in the open position, the solar cell 110 is used in the electric system 117. When the first switch 105 is in the closed position, the resistor 111 is used in the electric system 117. The first switch 105 disconnects from the solar cell 110 and connects to the resistor 111 after the initial magnetizing current is supplied to the first solenoid 101 and the second solenoid 102. In an embodiment, the control system 119 comprises a magnetic motor (not shown) for controlling the second switching system 106 between two positions.

In an embodiment, the second switching system 106 comprises a pendulum system 200 as exemplarily illustrated in FIG. 2, FIGS. 5A-5B, FIGS. 7A-7B, FIGS. 9A-9B, and FIGS. 10A-15B. In this embodiment, the second switching system 106 is configured as a pendulum system 200 to alternately connect at least one switching node P 107 to one of at least two contact nodes, that is, contact node A 108 and contact node B 109 in the electric system 117 to form a closed electric system 117 with the first solenoid 101 or the second solenoid 102, the solar cell 110, and a load 116, and to change a magnetic field induced in the first solenoid 101 or the second solenoid 102 by alternating the initial magnetizing current between the first solenoid 101 and the second solenoid 102. The changing magnetic field induces an electric current, for example, an alternating current in the third solenoid 103. That is, the switching node P 107 of the second switching system 106 alternates between two positions, that is, between the contact node A 108 and the contact node B 109. In an example, when the switching node P 107 of the second switching system 106 is connected to the contact node A 108, a closed electric system 117 is formed with the first solenoid 101, the solar cell 110, and the load 116. When the switching node P 107 of the second switching system 106 is connected to the contact node B 109, a closed electric system 117 is formed with the second solenoid 102, the solar cell 110, and the load 116.

The first solenoid 101 and the second solenoid 102 are routed in opposing directions resulting in inducing magnetic fields in opposing directions, one with the north pole "N" facing up and the other with the north pole "N" facing down as exemplarily illustrated in FIG. 1. The third solenoid 103 is routed on the same iron core 104 as that of the first solenoid 101 and the second solenoid 102. Therefore, the induced magnetic field passes through the third solenoid 103 to induce an electromotive force. Furthermore, when the switching node P 107 of the second switching system 106 is alternated between the two contact nodes, that is, the contact node A 108 and the contact node B 109 rapidly, a high alternating current is induced in the third solenoid 103. The second switching system 106 is alternated by energy harvested from motion. The dynamic system 100 disclosed herein further comprises multiple diodes 112a, 112b, 112c, and 112d electrically connected within the electric system 117. The diodes 112a, 112b, 112c, and 112d convert the alternating current induced in the third solenoid 103 into a direct current. The diodes 112a, 112b, 112c, and 112d are electrically connected to the load 116 through a super capacitor 114 and an inductor 115. The super capacitor 114 and the inductor 115 that are electrically connected to the diodes 112a, 112b, 112c, and 112d operate together to reduce an output current ripple.

The second switching system 106 is used to connect the switching node P 107 to either the contact node A 108 or the contact node B 109. When the switching node P 107 is connected to the contact node A 108 or the contact node B 109, a closed electric system 117 is formed by the first solenoid 101 or the second solenoid 102, the second switching system 106, the solar cell 110, and the load 116. The first solenoid 101 or the second solenoid 102 acts as an electromagnet and induces a magnetic field. The routing directions of the wire of the first solenoid 101 and the second solenoid 102 are opposite, and therefore the induced magnetic fields inside the first solenoid 101 and the second solenoid 102 have opposite directions, for example, one with the north pole "N" facing up and the other with the north pole "N" facing down. When the second switching system 106 alternates the switching node P 107 between two positions, that is, between the contact node A 108 and the contact node B 109, the induced magnetic field inside the single iron core 104 constantly changes with time. Since the single iron core 104 used in the dynamic system 100 disclosed herein is continuous without an air gap, the leakage of the induced magnetic flux to the ambient environment, for example, the surrounding air is negligible. Therefore, the magnetic flux through the third solenoid 103 is the same as the magnetic flux induced by the first solenoid 101 or the second solenoid 102. The changing magnetic flux induces an electromotive force in the third solenoid 103 which thereby generates an alternating current through the third solenoid 103.

A bridge rectifier formed, for example, by four diodes 112a, 112b, 112c, and 112d for two phases and six diodes for three phases of a generator, converts the alternating current into a direct current, which fluctuates between maximum and zero. The inductor 115 and the super capacitor 114 are used to filter the current ripple. The dynamic system 100 disclosed herein generates an output voltage, for example, using the following equation:

$$V = -N_2 \frac{N \cdot \mu \cdot \mu_o \cdot A}{L} \cdot \frac{\Delta i}{\Delta t}$$

where N=1000 turns is the number of turns in the first solenoid 101 or the second solenoid 102; $N_2$=1000 turns is the number of turns in the third solenoid 103; $\mu_o$=4π×10⁻⁷ Weber/A*m is the permeability of free space; μ=1000 is the relative permeability of the iron core 104 through the third solenoid 103; A=1.5×10⁻⁵ m² is a cross-sectional area of the third solenoid 103; L=0.06 m is the length of a magnetic path; Δi is the change in the electric current; and Δt is the change in time.

Consider an example where the switching node P 107 of the second switching system 106 is alternated at a frequency of 60 Hz and where the electric current changes from a minimum at 0 mA to a maximum at 30 mA in half a time period, for example, 1/120 seconds, then Δi=30 mA, Δt=1/120 seconds (s), and Δi/Δt=3.6 A/s. From the above equation, the dynamic system 100 disclosed herein generates the following output voltage:

V=1000×1000×1000×4π10⁻⁷×1.5×10⁻⁵×3.6/0.06=1V

Based on the above calculation, the dynamic system 100 generates a voltage of, for example, about 1V if the switching node P 107 of the second switching system 106 is alternated, for example, at 60 Hz.

Figure 2:
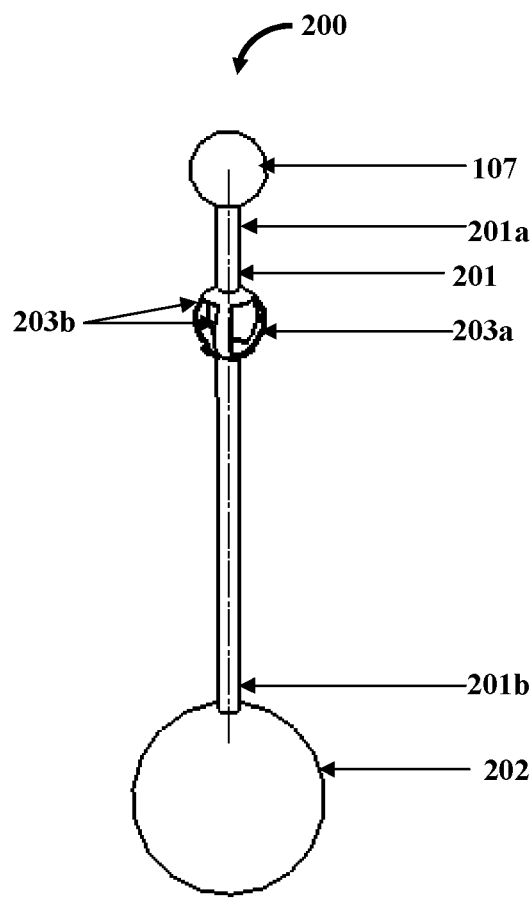
FIG. 2 exemplarily illustrates a perspective view of a pendulum system of the dynamic system, showing a socket of a ball joint configured on a conducting rod of the pendulum system.
Figure 5A:
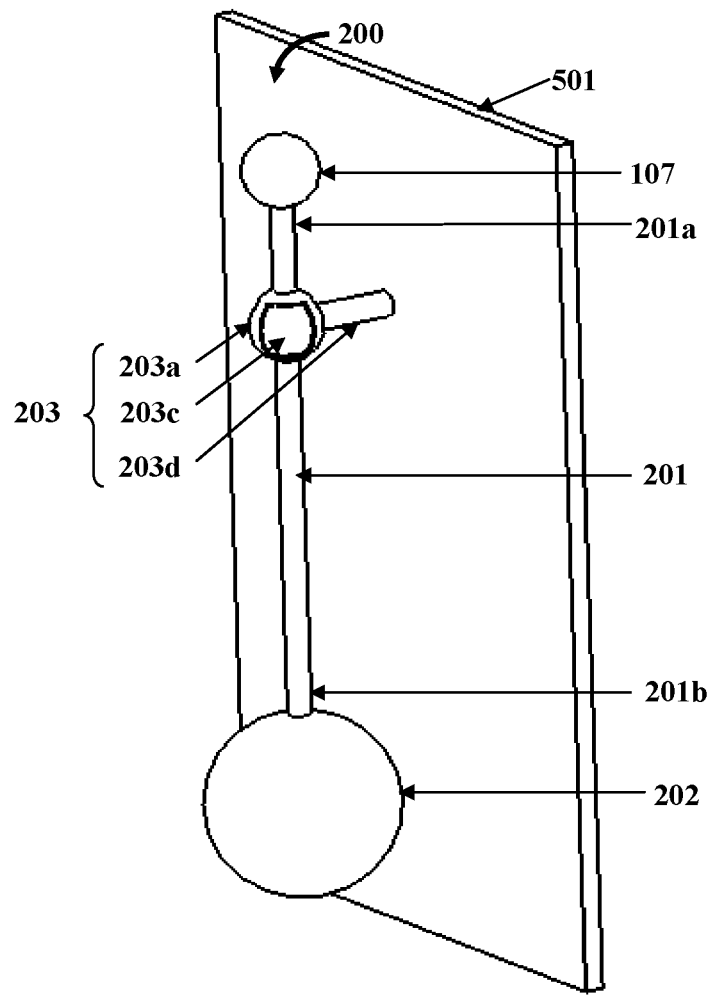
FIG. 5A exemplarily illustrates a right side perspective view of the pendulum system, showing the ball joint configured on the conducting rod of the pendulum system and connected to a wall of a housing of the dynamic system.
Figure 5B:
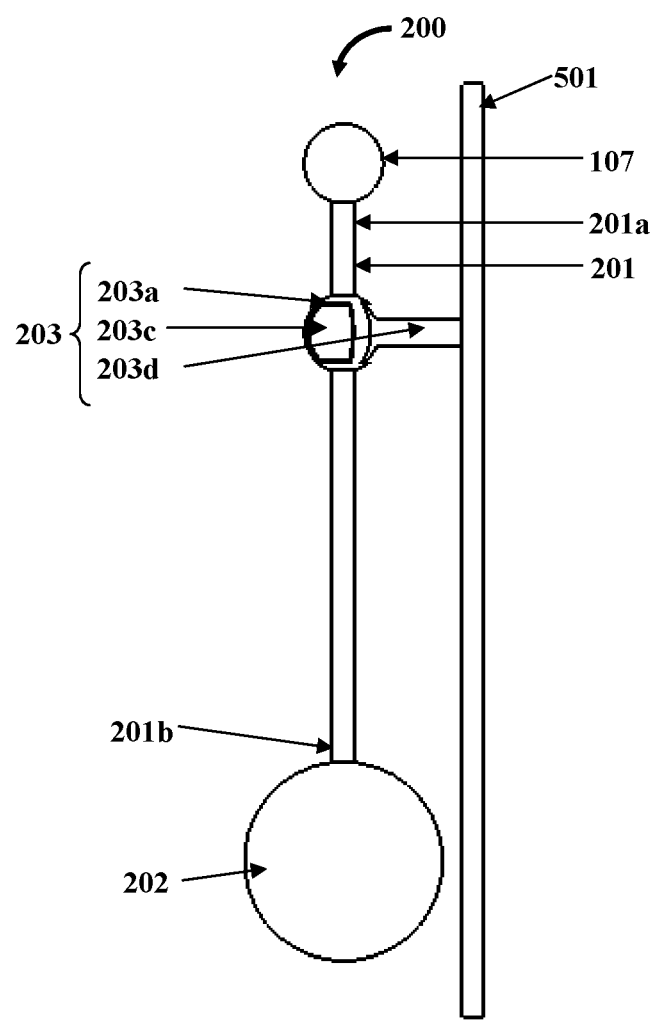
FIG. 5B exemplarily illustrates a right side elevation view of the pendulum system, showing the ball joint configured on the conducting rod of the pendulum system and connected to a wall of a housing of the dynamic system.

FIG. 2 exemplarily illustrates a perspective view of a pendulum system 200 of the dynamic system 100, showing a socket 203a of a ball joint 203 exemplarily illustrated in FIGS. 5A-5B, configured on a conducting rod 201 of the pendulum system 200. As exemplarily illustrated in FIG. 2, the pendulum system 200 comprises a conducting rod 201 and a mass 202. The conducting rod 201 is made of, for example, aluminum, copper, brass, copper plated with silver, brass plated with silver, etc. The switching node 107 is connected to an upper end 201a of the conducting rod 201. The conducting rod 201 extends from the switching node 107. The conducting rod 201 is rotatably connected to a wall 501 of a housing 1401 of the dynamic system 100 exemplarily illustrated in FIGS. 7A-7C, FIGS. 9A-9C, and FIG. 14, via one or more pivot joints. As used herein, "pivot joint" refers to a flexible or rigid connector between two parts, for example, rods, that allows rotation of one rod about the other rod. The pivot joints comprise, for example, ball joints or spherical joints, pin joints, coated joints, plated joints, etc. Also, as used herein, a "ball joint" or a "spherical joint" refers to a coupling between two rods, which comprises a spherical stud or a ball 203c exemplarily illustrated in FIG. 3, accommodated into a spherical socket 203a, allowing free movement of the spherical stud or ball 203c within the spherical socket 203a, and therefore free movement of one rod about the other rod. Also, as used herein, a "pin joint" refers to a flexible joint defined by a pin inserted through an opening in a rod to be rotated, for rotating the rod about an axis of the pin. Also, as used herein, a "coated joint" refers to a joint that is coated with a protective coating that reduces friction, wear and tear, etc., for allowing rotation of one part about another part connected by the joint. A joint is coated with the coating through multiple processes, for example, powder coating, spraying, etc. Also, as used herein, a "plated joint" refers to a joint which is coated with a protective coating by an electroplating process.

In an embodiment, the conducting rod 201 of the pendulum system 200 is rotatably connected to the wall 501 of the housing 1401 of the dynamic system 100 via a pivot joint configured as a ball joint 203 as exemplarily illustrated in FIGS. 5A-5B. The ball joint 203 comprises a ball 203c exemplarily illustrated in FIG. 3, and a socket 203a. The socket 203a of the ball joint 203 is rigidly configured as part of the conducting rod 201 as exemplarily illustrated in FIG. 2. The ball 203c of the ball joint 203 is installed in the socket 203a as exemplarily illustrated in FIGS. 5A-5B. In an embodiment, the socket 203a of the ball joint 203 is configured with multiple cuts 203b to reduce weight of the ball joint 203 and increase a range of a multiple degree of freedom pendulum motion in the pendulum system 200. The multiple cuts 203b on the socket 203a result in reduced weight and reduced friction. The mass 202 of the pendulum system 200 is rigidly connected to a distal end 201b of the conducting rod 201. An ambient motion from the housing 1401 generates a multiple degree of freedom pendulum motion in the pendulum system 200, which causes the conducting rod 201 with the mass 202 of the pendulum system 200 to move in a first direction and a second direction opposing the first direction.

Figure 3:
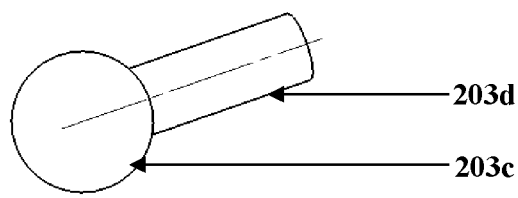
FIG. 3 exemplarily illustrates a perspective view of a ball of the ball joint.

FIG. 3 exemplarily illustrates a perspective view of a ball 203c of the ball joint 203 exemplarily illustrated in FIGS. 5A-5B. The ball joint 203 is a joint created by the ball 203c within the socket 203a exemplarily illustrated in FIG. 2, where the socket 203a moves around the ball 203c to allow rotary motion of the socket 203a in multiple directions, for example, in any direction about 360° depending on flexible characteristics of the material used to manufacture the ball joint 203. The ball joint 203 therefore allows the conducting rod 201 to rotate with multiple degrees of freedom. The ball joint 203 further comprises a ball joint extension 203d extending from the ball 203c and configured to be rigidly connected to the wall 501 of the housing 1401 exemplarily illustrated in FIGS. 5A-5B and FIG. 14, to allow the conducting rod 201 to rotate about the ball joint 203. The ball 203c is, for example, made of Teflon® of The Chemours Company FC, LLC, while the socket 203a is, for example, made of aluminum, copper, brass, silver coated copper, etc.

Figure 4:
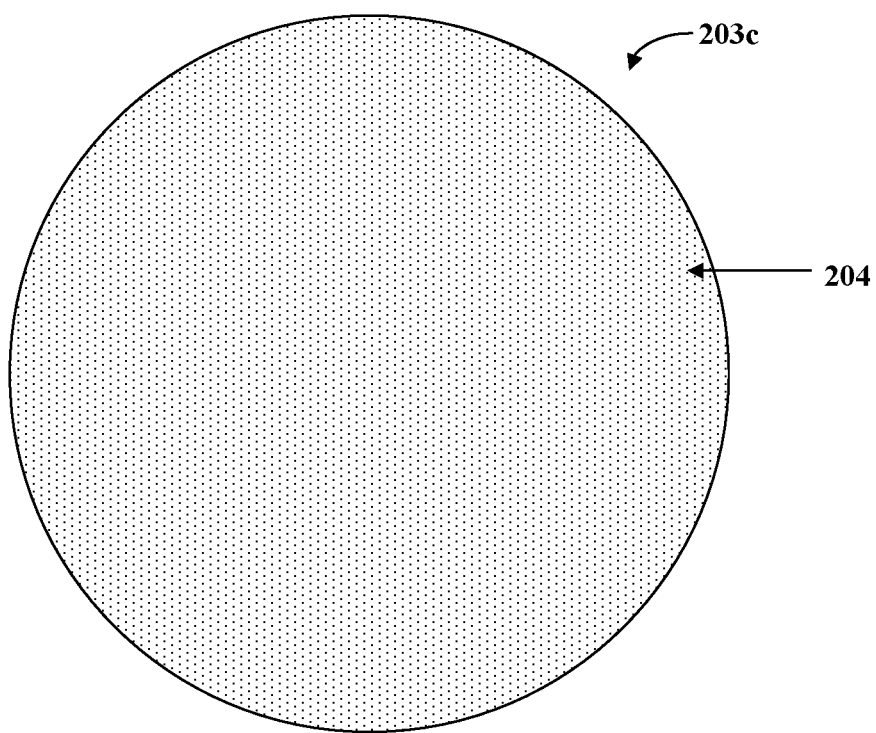
FIG. 4 exemplarily illustrates the ball of the ball joint applied with a coating that reduces friction, wear and tear, and ensures a longer life of the ball joint.

FIG. 4 exemplarily illustrates the ball 203c of the ball joint 203 applied with a coating 204 that reduces friction, wear and tear, and ensures a longer life of the ball joint 203. The ball joint 203 facilitates a multiple degree of freedom pendulum motion in the pendulum system 200 exemplarily illustrated in FIGS. 5A-5B. The coating 204 applied on the ball 203c of the ball joint 203 is, for example, made from Teflon®, a hard anodization material, or a Teflon® impregnated anodization material. Due to repeated oscillations of the conducting rod 201 of the pendulum system 200 exemplarily illustrated in FIGS. 5A-5B, the ball 203c of the ball joint 203 continuously rubs against the socket 203a. Without the coating 204, the rough exterior of the ball 203c and the rough interior of the socket 203a gradually wear each other out to a point where the ball joint 203 becomes loose. The coating 204 on the ball 203c of the ball joint 203 ensures less friction, and hence less wear and tear, long life, and smooth functioning of the ball joint 203.

Figure 14:
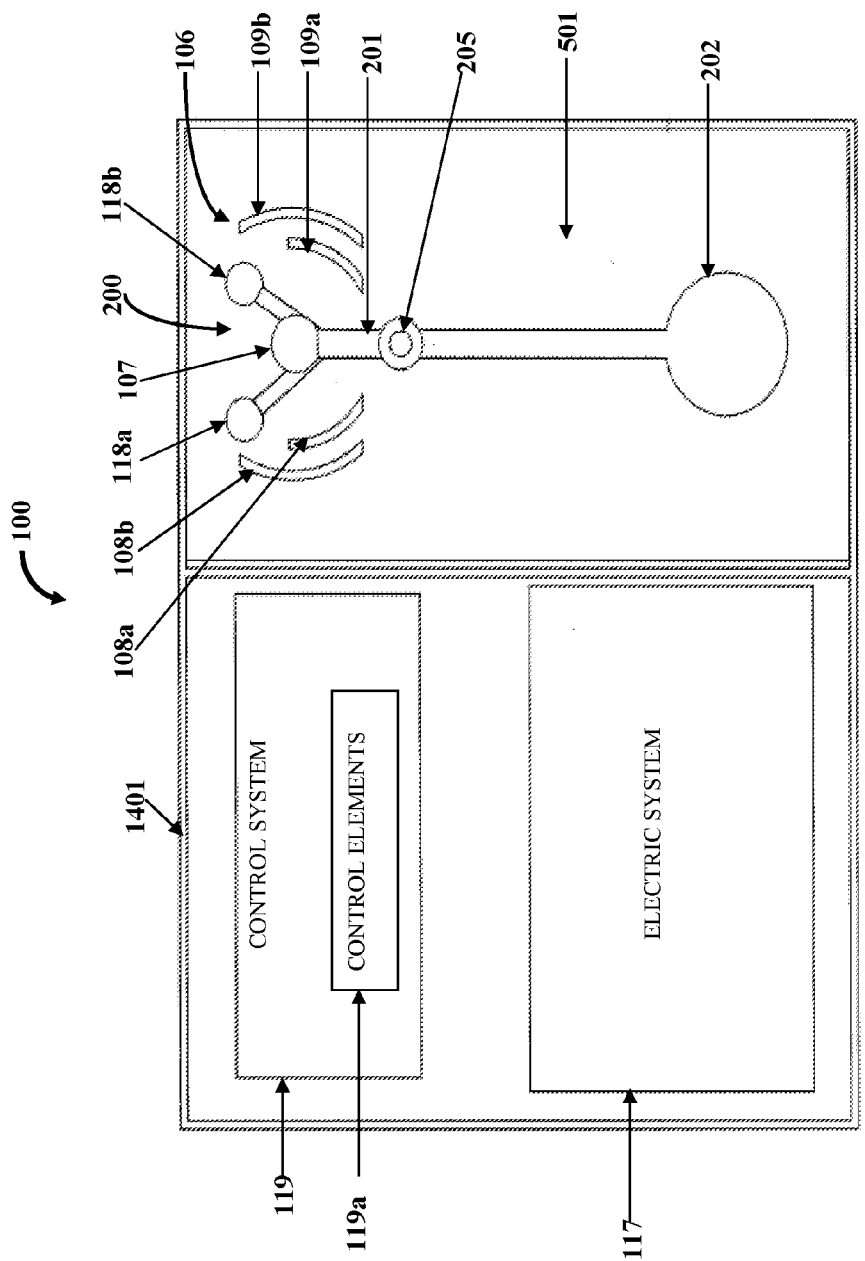
FIG. 14 exemplarily illustrates a front elevation view of an embodiment of the dynamic system, showing a control system, an electric system, and the second switching system comprising supplementary switching nodes, supplementary contact nodes, and the pendulum system enclosed in a housing.

FIGS. 5A-5B exemplarily illustrate a right side perspective view and a right side elevation view respectively, of the pendulum system 200, showing the ball joint 203 configured on the conducting rod 201 of the pendulum system 200 and connected to a wall 501 of a housing 1401 of the dynamic system 100 exemplarily illustrated in FIG. 14. The ball 203c of the ball joint 203 is installed into the socket 203a that is rigidly configured in the conducting rod 201. The ball joint extension 203d extends from the ball 203c and out through the socket 203a and rigidly connects to the wall 501 of the housing 1401. Due to the rigid connection of the ball joint extension 203d that extends from the ball 203c to the wall 501, the conducting rod 201 freely rotates about the ball 203c of the ball joint 203 with multiple degrees of freedom, thereby allowing a multiple degree of freedom pendulum motion in the pendulum system 200. An ambient motion triggers the pendulum motion of the pendulum system 200 comprising the conducting rod 201 and the mass 202 in multiple directions about the ball joint 203. The multiple cuts 203b on the socket 203a of the ball joint 203 reduces the weight and friction of the ball joint 203, thereby increasing the range of the multiple degree of freedom pendulum motion in the pendulum system 200. In an embodiment, the ball joint 203 is made from of a thermal plastic alloy and a highly abrasion resistant fiber, which is a solid lubricant, for example, Iglide® L280 of Igus® GmbH, Federal Republic of Germany. The Iglide® L280 plastic bearing is a wear resistant plastic bushing material that offers an optimal service life to the ball joint 203. Other examples of materials for manufacturing the ball joint 203 are stainless steel, 6060 T6 aluminum and other metals, plastic, etc.

Figure 6:
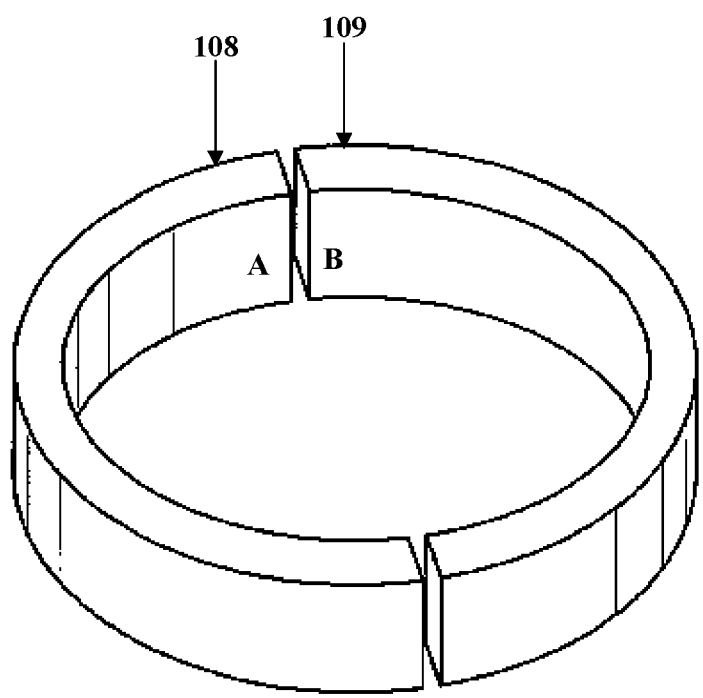
FIG. 6 exemplarily illustrates a top perspective view showing an embodiment of contact nodes of the second switching system configured in a cylindrical shape.

FIG. 6 exemplarily illustrates a top perspective view showing an embodiment of the contact nodes A 108 and B 109 of the second switching system 106. The contact node A 108 and the contact node B 109 can be configured in multiple different shapes. For example, the contact node A 108 and the contact node B 109 are each configured in a partial cylindrical shape as exemplarily illustrated in FIG. 6. The efficiency of the dynamic system 100 exemplarily illustrated in FIG. 1, is improved by increasing contact capabilities or frequencies of alternation of the switching node P 107 of the second switching system 106 exemplarily illustrated in FIGS. 7A-7C. This is achieved, for example, by increasing contact of the switching node P 107 with the contact node A 108 and the contact node B 109. In an embodiment, the contact of the switching node P 107 with the contact node A 108 and the contact node B 109 is increased by attaching a shielding material, for example, a radio frequency (RF) gasket material on both the contact node A 108 and the contact node B 109, and/or on the switching node P 107 to provide an improved contact between the switching node P 107 and the contact node A 108 and the contact node B 109 and to reduce resistivity of the dynamic system 100, thereby increasing the efficiency of the dynamic system 100.

Figure 7A:
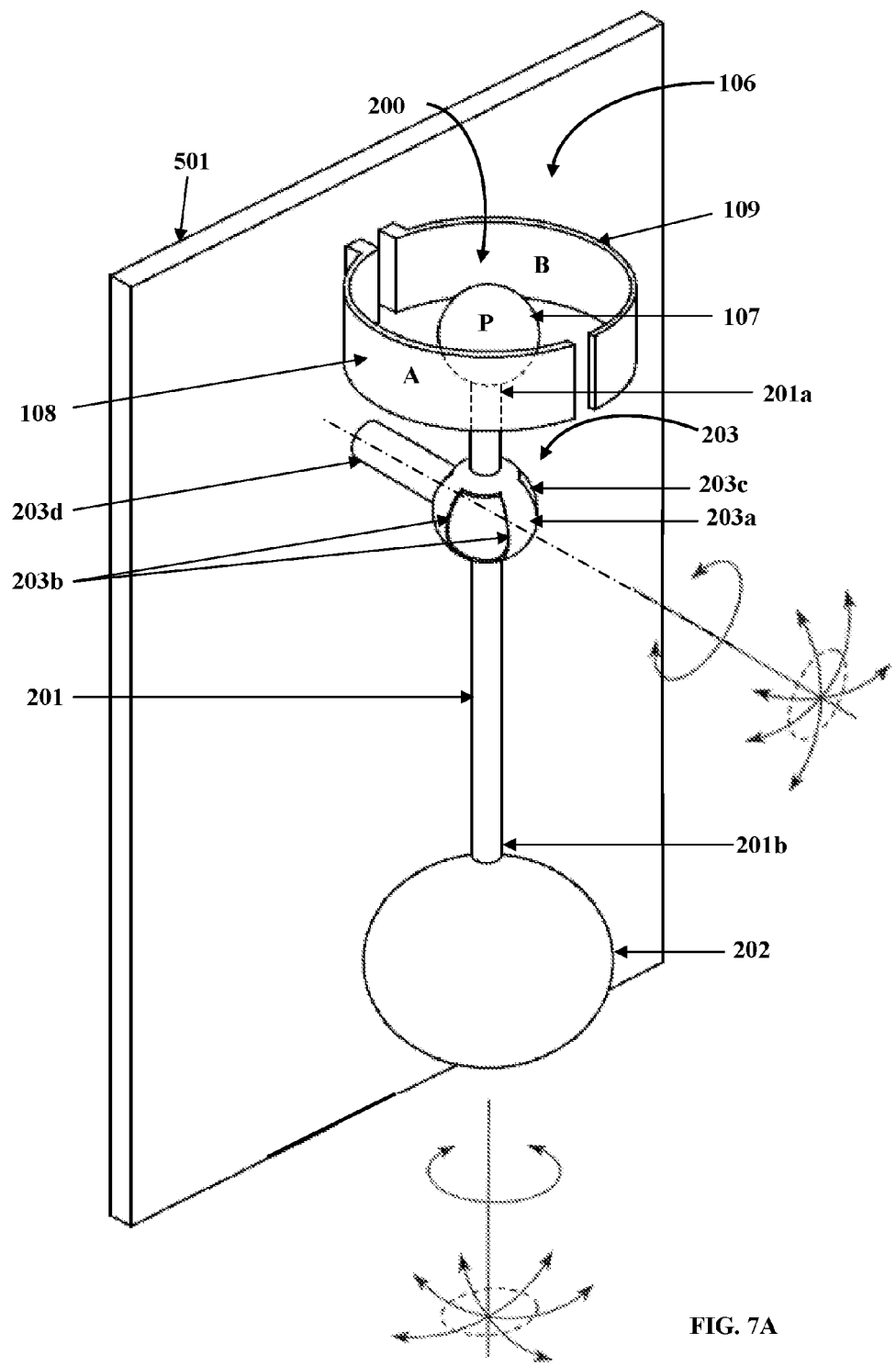
FIG. 7A exemplarily illustrates a left side perspective view of an embodiment of the second switching system comprising contact nodes configured in a cylindrical shape, a switching node, and the pendulum system.
Figure 7B:
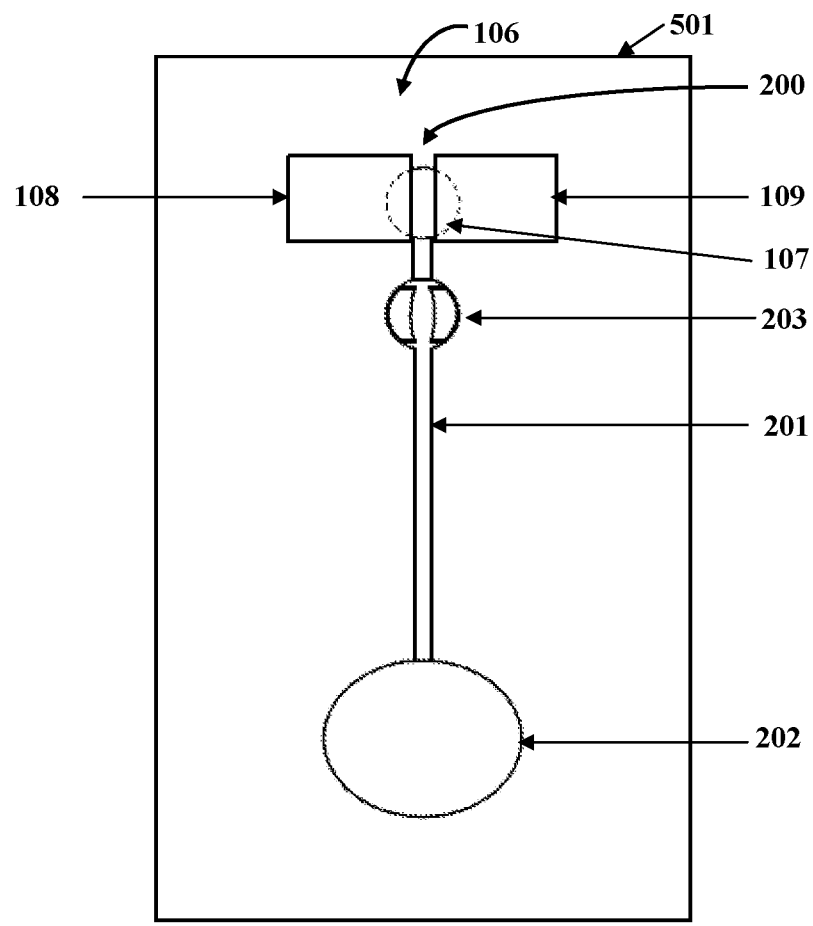
FIG. 7B exemplarily illustrates a front elevation view of the embodiment of the second switching system shown in FIG. 7A.
Figure 7C:
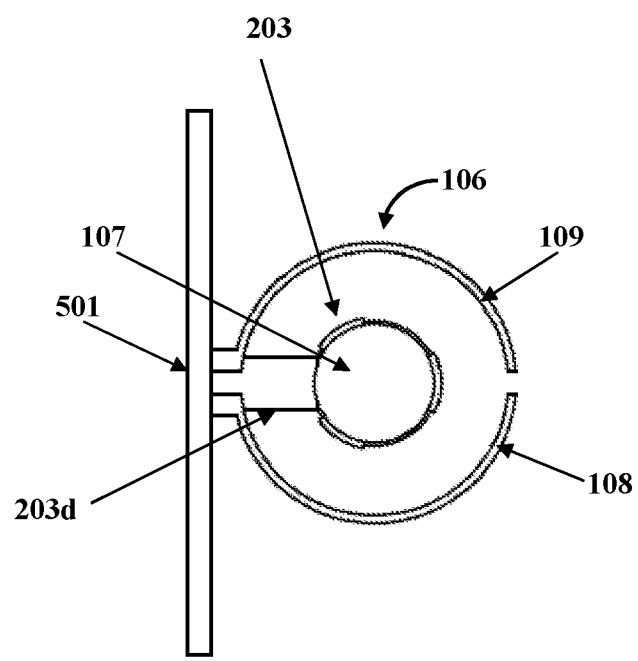
FIG. 7C exemplarily illustrates a top plan view of the embodiment of the second switching system shown in FIG. 7A.

FIGS. 7A-7C exemplarily illustrate a left side perspective view, a front elevation view, and a top plan view respectively, of an embodiment of the second switching system 106 comprising contact nodes A 108 and B 109 configured in a generally cylindrical shape, the switching node P 107, and the pendulum system 200. The connecting rod 201 of the pendulum system 200 is connected to the switching node P 107 and extends below the switching node P 107. In this embodiment, the pendulum system 200 is rotatably connected to the wall 501 of the housing 1401 exemplarily illustrated in FIG. 14, for example, via the ball joint 203 as disclosed in the detailed description of FIGS. 2-5B. The conducting rod 201 of the pendulum system 200 rotates about the ball joint 203. As exemplarily illustrated in FIGS. 7A-7C, the cylindrical contact nodes A 108 and B 109 are attached to and extend out of the wall 501. The switching node P 107 positioned on the upper end 201a of the conducting rod 201 is installed between the contact nodes 108 and 109.

In an embodiment, the contact node A 108 and the contact node B 109 of the second switching system 106 are, for example, made of copper sheets with dimensions, for example, about 2×2 mm$^2$, while the switching node P 107 is connected to the conducting rod 201 of the pendulum system 200 having a length of, for example, about 6 cm. The distal end 201b of the conducting rod 201 connects to the mass 202 weighing, for example, about 200 grams to harvest mechanical motion energy. The pendulum system 200 of the second switching system 106 turns on/off a magnetizing current in the electric system 117 for changing the magnetic field in the first solenoid 101 and the second solenoid 102 exemplarily illustrated in FIG. 1. The switching node P 107 of the second switching system 106 used to turn on/off the magnetizing current is driven by energy harvested from a mechanical motion. In an embodiment, the second switching system 106 for turning on/off the magnetizing current is reciprocating or controlled by the pendulum system 200 exemplarily illustrated in FIGS. 7A-7C. The second switching system 106 closes or opens an electrical loop of the first solenoid 101 and the second solenoid 102, resulting in a changing magnetic field. The changing magnetic field is used to generate electricity. A design of the second switching system 106 for reciprocating motion is exemplarily illustrated in FIGS. 7A-7C.

An ambient or environmental motion from the wall 501 generates a multiple degree of freedom pendulum motion in the pendulum system 200, causing the conducting rod 201 with the mass 202 of the pendulum system 200 to move in a first direction, for example, the right direction, and in a second direction, for example, the left direction, opposing the first direction to alternately connect the switching node P 107 to the contact nodes A 108 and B 109 in the electric system 117 to change the induced magnetic field in the first solenoid 101 or the second solenoid 102 exemplarily illustrated in FIG. 1, and induce an electric current, for example, an alternating current in the third solenoid 103 exemplarily illustrated in FIG. 1. That is, the ambient motion from the wall 501 of the housing 1401 drives the mass 202 of the pendulum system 200 in a right direction or a left direction, resulting in the switching node P 107 at the upper end 201a of the conducting rod 201 touching the contact node A 108 or the contact node B 109. The conducting rod 201 of the second switching system 106 rotates about the ball joint 203 that is rigidly connected to the wall 501 of the housing 1401, thereby allowing the switching node P 107 to touch the contact node A 108 or the contact node B 109. When the switching node P 107 is in contact with the contact node A 108, the switching node P 107 connects and completes the electric system 117 for the first solenoid 101, and when the switching node P 107 is in contact with the contact node B 109, the switching node P 107 connects and completes the electric system 117 for the second solenoid 102. When the second switching system 106 is moved or vibrated, the switching node P 107 moves back and forth between the contact node A 108 and the contact node B 109. To separate an electric circuit defined by the connection of the switching node P 107 to the contact node A 108 from the electric circuit defined by the connection of the switching node P 107 to the contact node B 109 exemplarily illustrated in FIG. 1, either the wall 501 of the housing 1401 or the ball joint extension 203d is insulated using an insulating material, for example, rubber, plastic, the ULTEM® resin 1000 of SABIC Global Technologies B. V., Teflon®, etc. Proper insulating and conduct circuits are not shown.

The continuous alternating contact of the switching node P 107 with the contact node A 108 and the contact node B 109 may induce a radio frequency interference, also referred to as an "electromagnetic interference (EMI)" that affects the operation of the electric system 117 exemplarily illustrated in FIG. 1. In an embodiment, both the contact node A 108 and the contact node B 109, and/or on the switching node P 107 are coated with a radio frequency (RF) gasket material, for example, a lining of aluminum foil, copper foil, duralumin, etc., selected, for example, based on material of the switching node P 107, material of the contact node A 108 and the contact node B 109, corrosion resistance properties, etc. The RF gasket material provides a RF shielding to the contact node A 108 and the contact node B 109, and/or on the switching node P 107 to suppress unwanted RF emissions in the electric system 117 and reduce the RF interference in the electric system 117, thereby increasing the efficiency of the dynamic system 100. The RF gasket material on both the contact node A 108 and the contact node B 109, and/or on the switching node P 107 reduces a contact resistance between the switching node P 107 and the contact node A 108 and the contact node B 109. As used herein, "contact resistance" refers to resistance to a flow of electric current due to surface conditions of the contact node A 108 and the contact node B 109, and/or on the switching node P 107 when the switching node P 107 contacts the contact node A 108 and the contact node B 109. A high contact resistance causes substantial heating in a high current device. Different surface coatings, for example, coatings of the RF gasket material prevent corrosion and hence reduce contact resistance when the switching node P 107 contacts the contact node A 108 or the contact node B 109.

Figure 8:
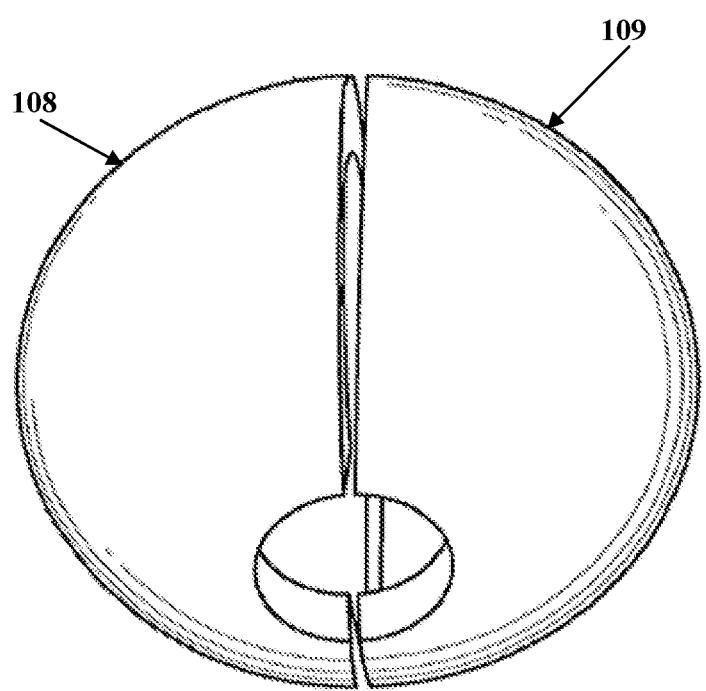
FIG. 8 exemplarily illustrates a bottom perspective view showing the contact nodes of the second switching system configured in a spherical shape.

FIG. 8 exemplarily illustrates a bottom perspective view showing an embodiment of the contact nodes 108 and 109 of the second switching system 106 configured in a spherical shape. In an embodiment, the contact node A 108 and the contact node B 109 are configured in a spherical shape as exemplarily illustrated in FIG. 8.

Figure 9A:
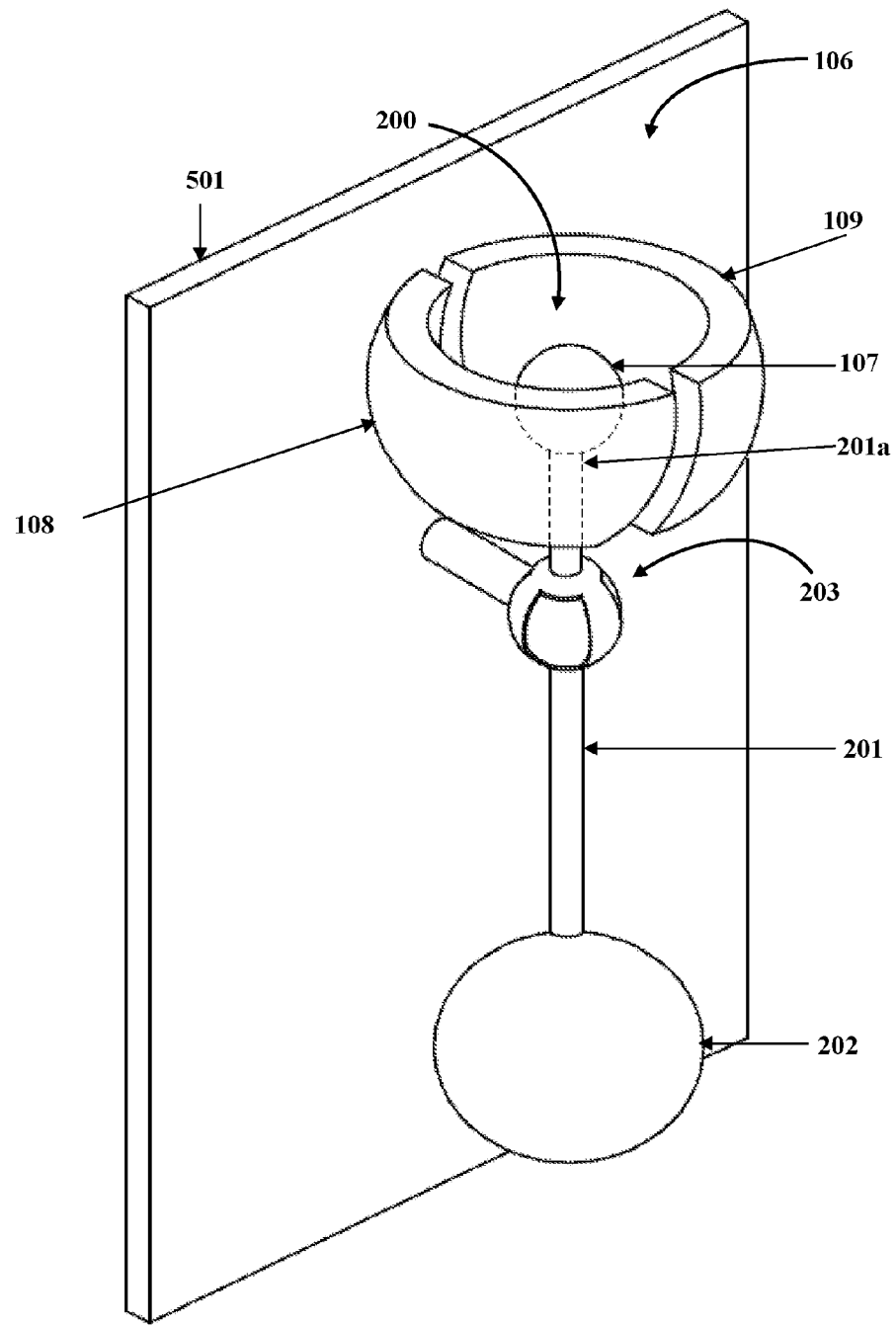
FIG. 9A exemplarily illustrates a left side perspective view of an embodiment of the second switching system, showing the contact nodes configured in a spherical shape.
Figure 9B:
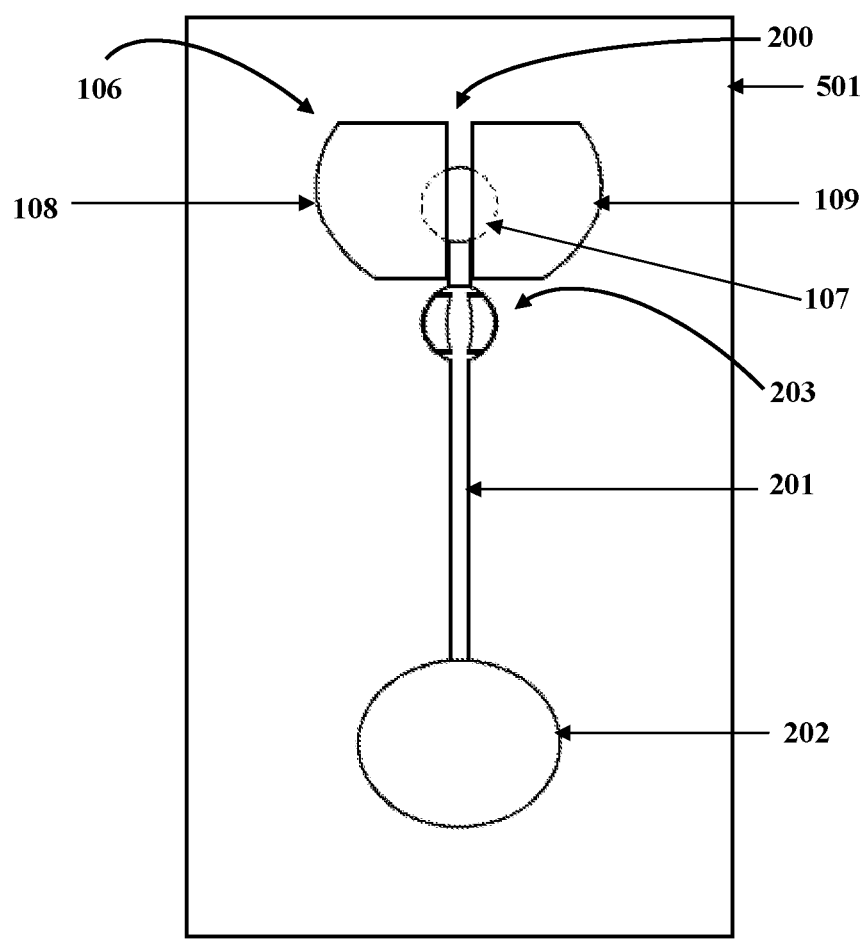
FIG. 9B exemplarily illustrates a front elevation view of the embodiment of the second switching system shown in FIG. 9A.
Figure 9C:
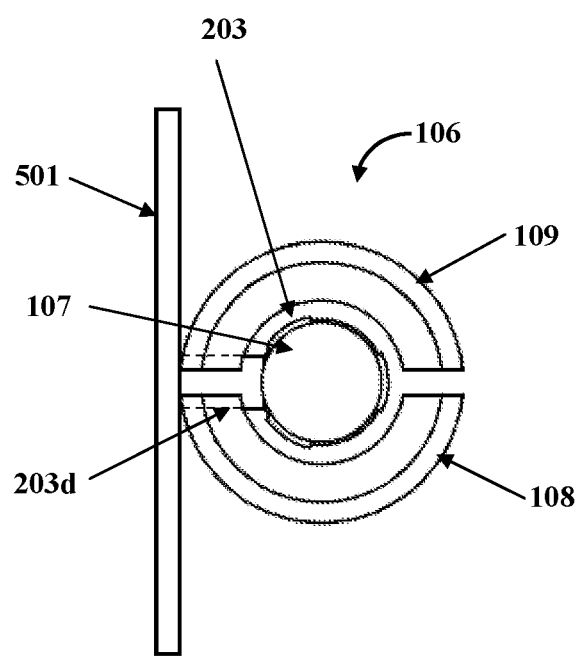
FIG. 9C exemplarily illustrates a top plan view of the embodiment of the second switching system shown in FIG. 9A.

FIGS. 9A-9C exemplarily illustrate a left side perspective view, a front elevation view, and a top plan view of an embodiment of the second switching system 106, showing the contact nodes 108 and 109 configured in a spherical shape. In this embodiment, the pendulum system 200 is rotatably connected to the wall 501 of the housing 1401 exemplarily illustrated in FIG. 14, for example, via the ball joint 203 disclosed in the detailed description of FIGS. 2-5B. The conducting rod 201 of the pendulum system 200 rotates about the ball joint 203. The switching node 107 positioned on the upper end 201*a* of the conducting rod 201 is installed between the spherical contact nodes 108 and 109 and alternately contacts the spherical contact nodes 108 and 109 as disclosed in the detailed description of FIGS. 7A-7C.

Figure 10A:
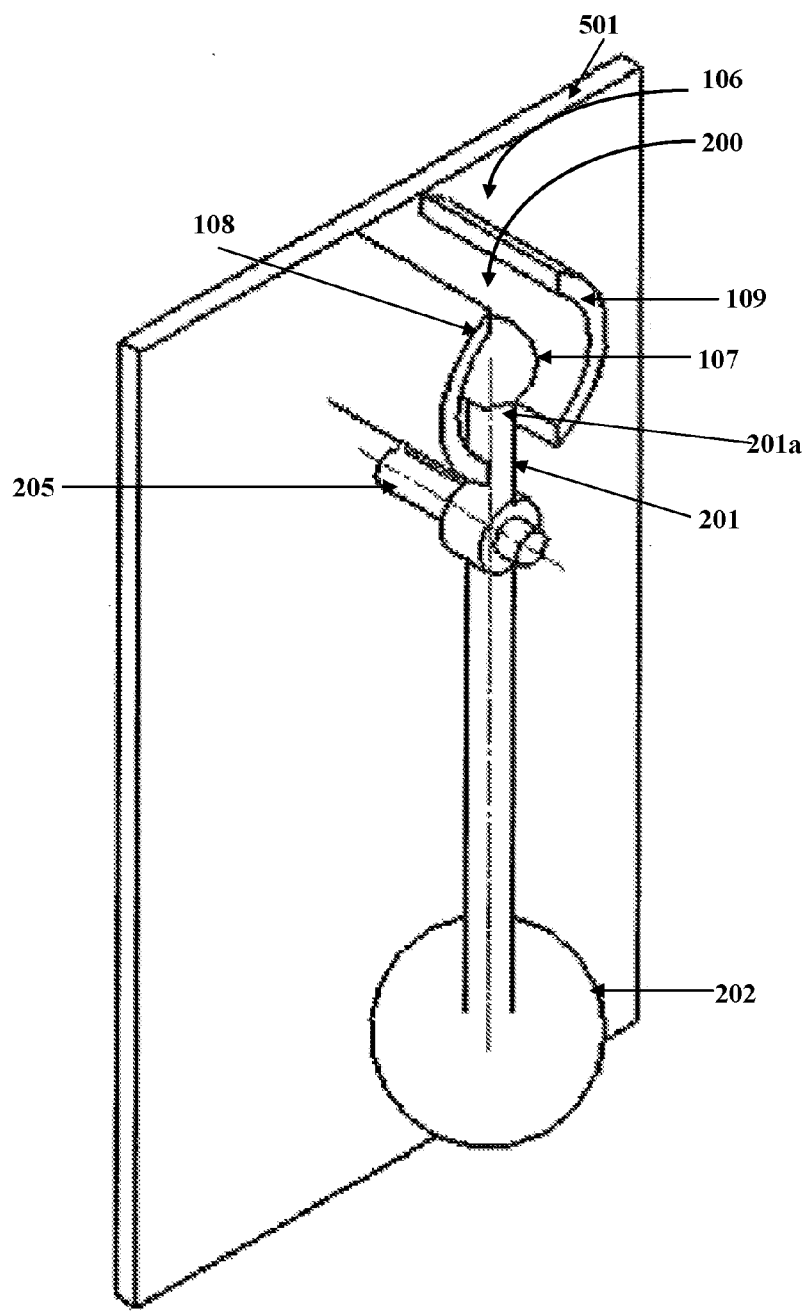
FIG. 10A exemplarily illustrates a left side perspective view of an embodiment of the second switching system, showing closely spaced contact nodes of the second switching system.
Figure 10B:
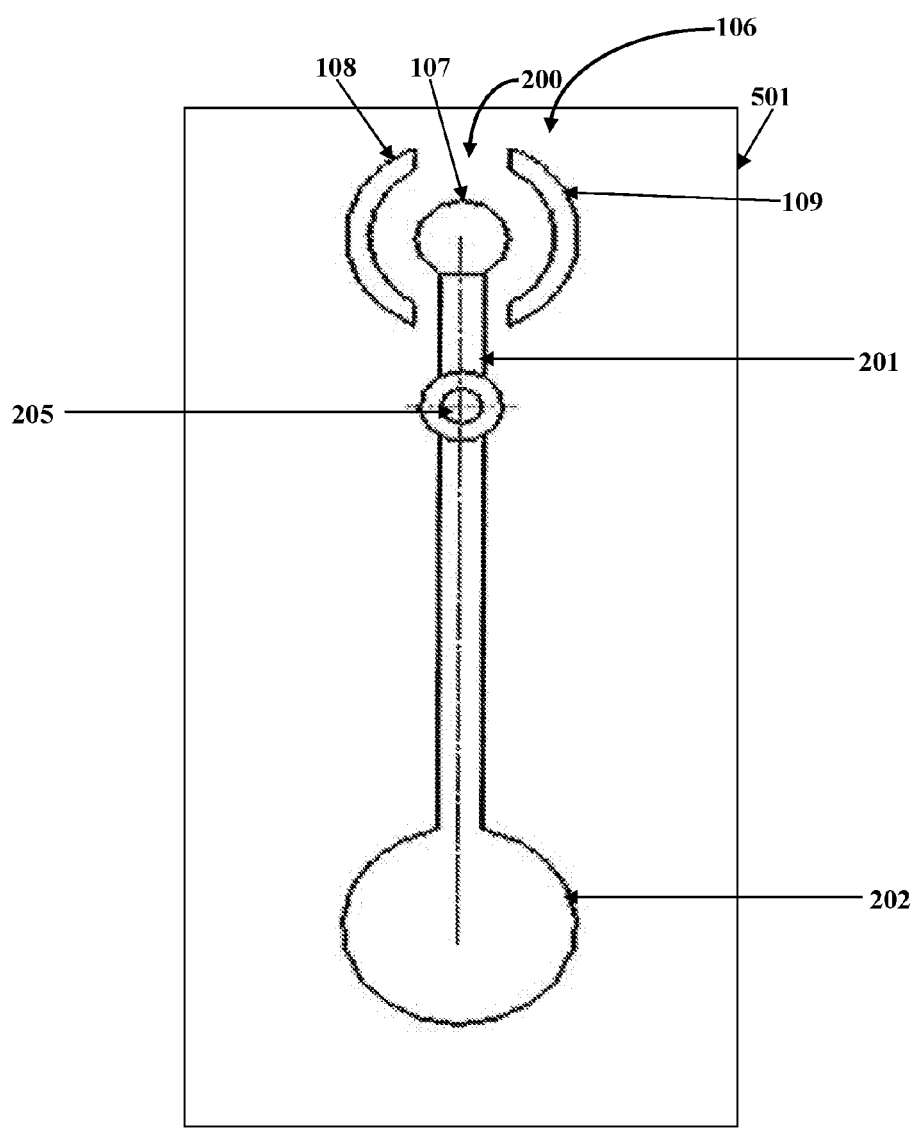
FIG. 10B exemplarily illustrates a front elevation view of the embodiment of the second switching system shown in FIG. 10A.

FIGS. 10A-10B exemplarily illustrate a left side perspective view and a front elevation view respectively, of an embodiment of the second switching system 106, showing closely spaced contact nodes 108 and 109 of the second switching system 106. In an embodiment, the pendulum system 200 is rotatably connected to the wall 501 of the housing 1401 as exemplarily illustrated in FIG. 14, for example, via a pivot pin 205. The pivot pin 205 is rigidly connected to the wall 501 as exemplarily illustrated in FIG. 10A, and allows the conducting rod 201 to rotate about the pivot pin 205. As exemplarily illustrated in FIGS. 10A-10B, the contact nodes 108 and 109 are configured as curved plates. The contact nodes 108 and 109 are attached to and extend out of the wall 501 as exemplarily illustrated in FIG. 10A. The switching node 107 positioned on the upper end 201*a* of the conducting rod 201 is installed between the contact nodes 108 and 109. An ambient motion from the wall 501 generates a multiple degree of freedom pendulum motion in the pendulum system 200, causing the conducting rod 201 with the mass 202 of the pendulum system 200 to move in a first direction, for example, the right direction, and in a second direction, for example, the left direction, opposing the first direction about the pivot pin 205, to alternately connect the switching node P 107 to the contact node A 108 or the contact node B 109 in the electric system 117 to change the induced magnetic field in the first solenoid 101 or the second solenoid 102 exemplarily illustrated in FIG. 1, and induce an alternating current in the third solenoid 103 exemplarily illustrated in FIG. 1.

Figure 11:
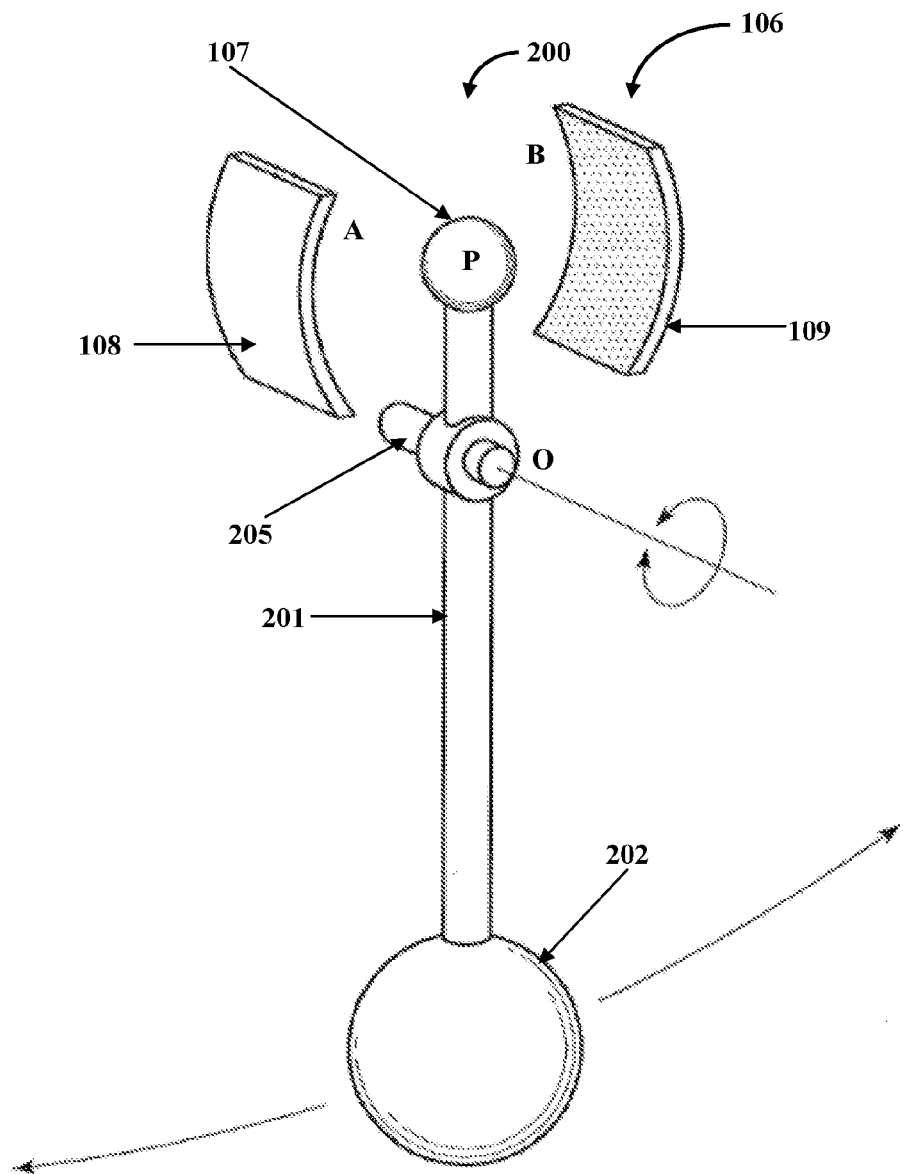
FIG. 11 exemplarily illustrates a perspective view of an embodiment of the second switching system, showing the contact nodes of the second switching system separated by a distance.

FIG. 11 exemplarily illustrates a perspective view of an embodiment of the second switching system 106, showing the contact nodes 108 and 109 of the second switching system 106 separated by a distance. The distance between the contact node A 108 and the contact node B 109 is increased as exemplarily illustrated in FIG. 9. The distance between the contact node A 108 and the contact node B 109 depends on a degree of ambient motion of the wall 501 of the housing 1401 exemplarily illustrated in FIG. 14, the size of the mass 202, and the weight of the mass 202. For example, if the ambient motion is negligible, the distance between the contact node A 108 and the contact node B 109 is configured to be proportionally small to allow the switching node P 107 to connect to the contact node A 108 or the contact node B 109 in the electric system 117, when the conducting rod 201 with the mass 202 of the pendulum system 200 moves in a first direction, for example, the right direction, and in a second direction, for example, the left direction, opposing the first direction. In this embodiment, the contact node A 108 and the contact node B 109 are configured as curved plates spaced apart by a distance from each other.

Figure 12:
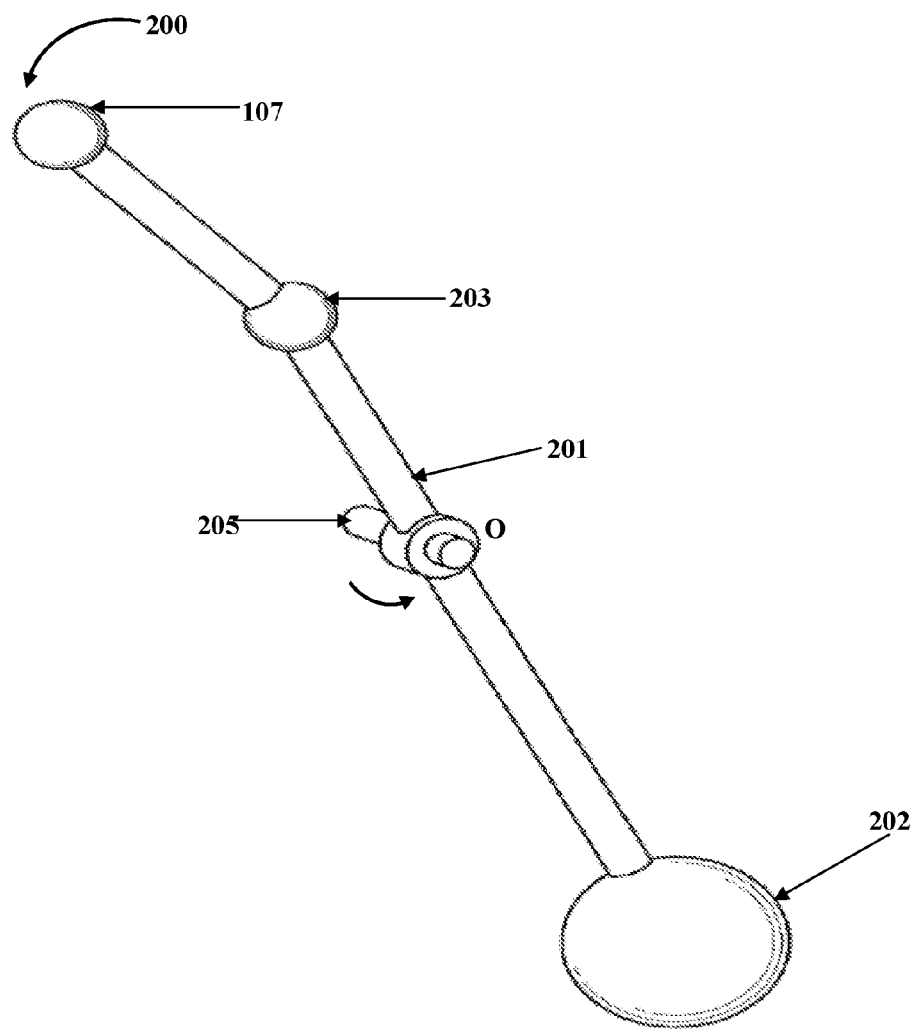
FIG. 12 exemplarily illustrates a perspective view showing an embodiment of the pendulum system having multiple pivot joints.

FIG. 12 exemplarily illustrates a perspective view showing an embodiment of the pendulum system 200 having multiple pivot joints. As exemplarily illustrated in FIG. 12, the conducting rod 201 rotates about two pivot joints, for example, about a pivot pin 205 and about the movable ball joint 203. When the pendulum system 200 moves, for example, in a right direction and a left direction about the pivot pin 205, the switching node 107 moves in multiple directions about the ball joint 203 to alternately contact the contact nodes 108 and 109 exemplarily illustrated in FIG. 6 and FIG. 8.

Figure 13A:
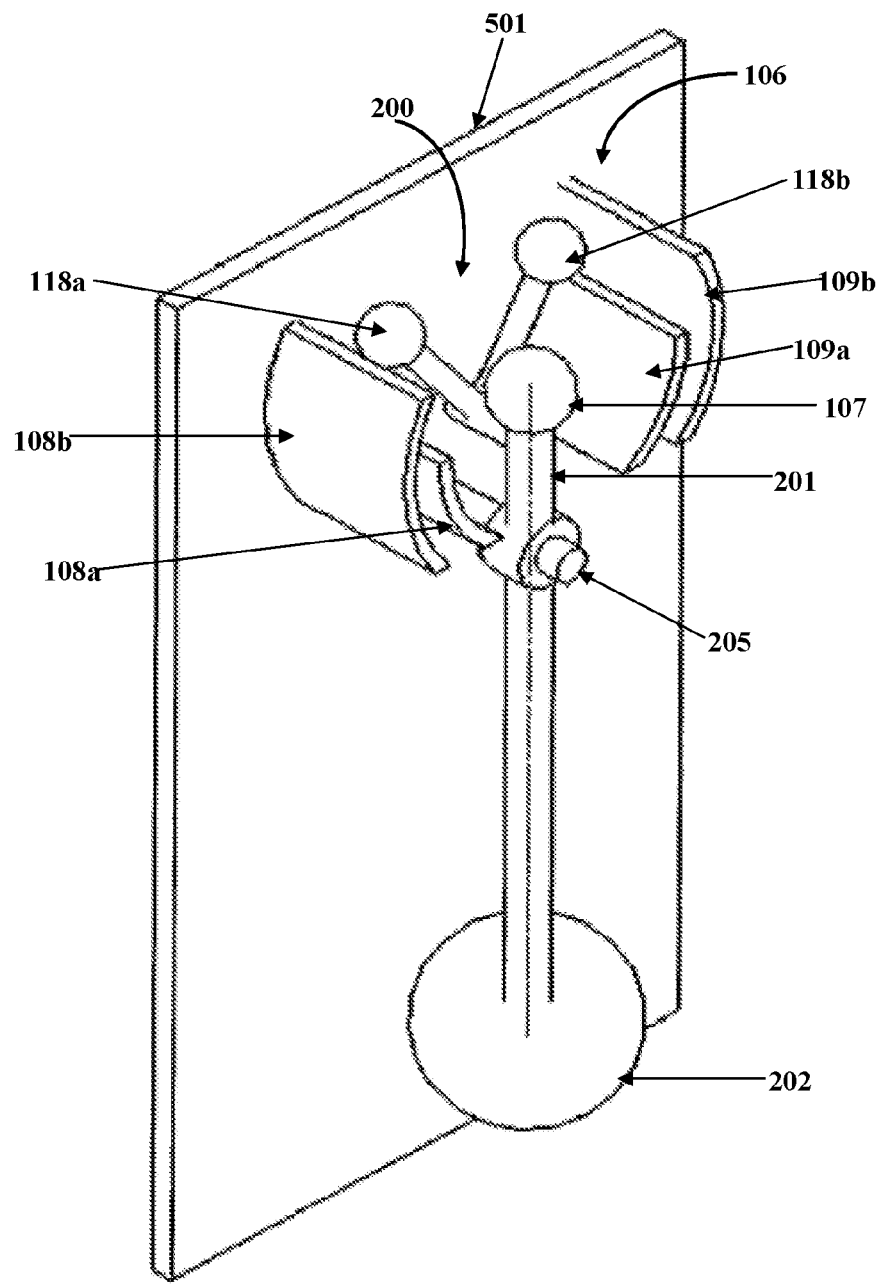
FIG. 13A exemplarily illustrates a left side perspective view of an embodiment of the second switching system comprising supplementary switching nodes and supplementary contact nodes.
Figure 13B:
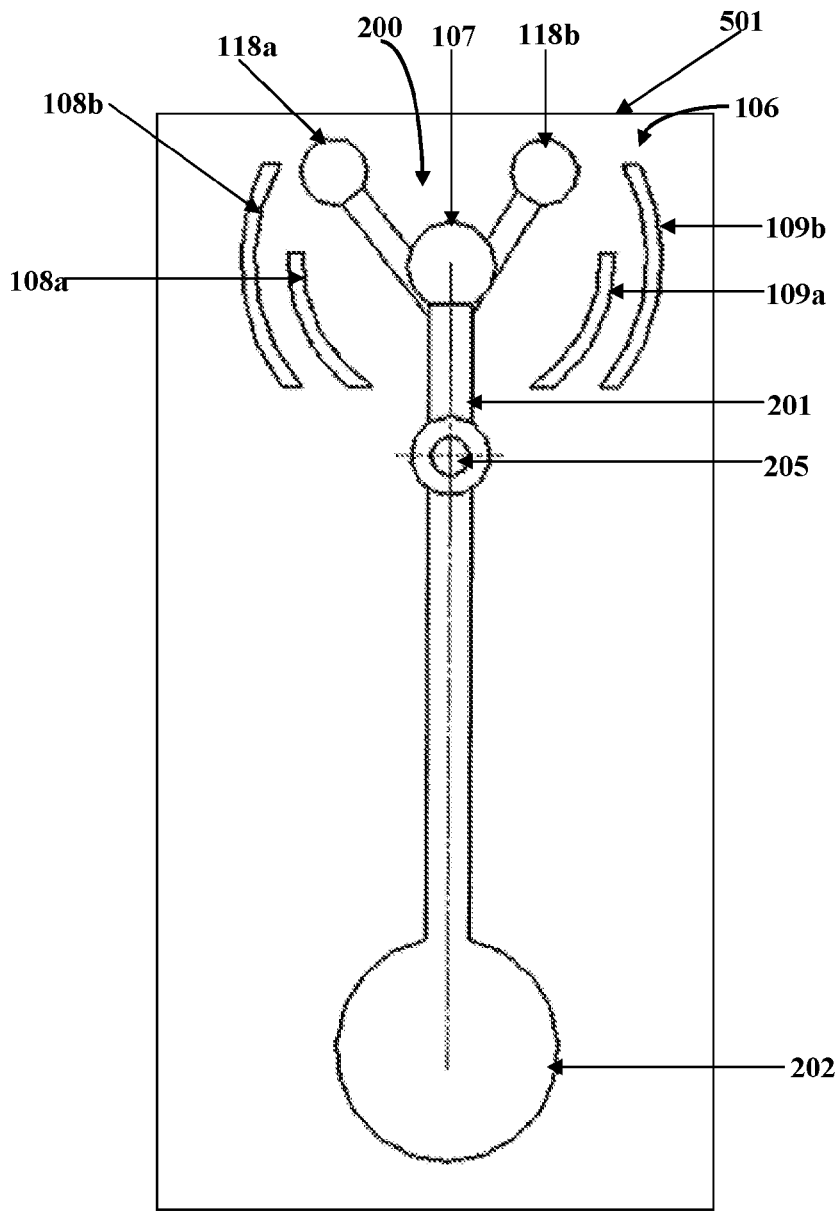
FIG. 13B exemplarily illustrates a front elevation view of the embodiment of the second switching system shown in FIG. 13A.

FIGS. 13A-13B exemplarily illustrate a left side perspective view and a front elevation view respectively, of the embodiment of the second switching system 106 comprising supplementary switching nodes 118*a* and 118*b* and supplementary contact nodes 108*a*, 108*b* and 109*a*, 109*b*. The supplementary switching nodes 118*a* and 118*b* are connected to the upper end 201*a* of the conducting rod 201 and proximal to the switching node 107. The supplementary switching nodes 118*a* and 118*b* are rigidly connected or flexibly connected to the upper end 201*a* of the conducting rod 201. A flexible connection of the supplementary switching nodes 118*a* and 118*b* to the upper end 201*a* of the conducting rod 201 is achieved, for example, using a spring type material. The supplementary switching nodes 118*a* and 118*b* are not connected to the wall 501.

In an embodiment, the supplementary switching nodes 118*a* and 118*b* are rigidly connected to the upper end 201*a* of the conducting rod 201 and therefore move in the same direction along with the switching node 107. The supplementary contact nodes 108a, 108b and 109a, 109b are positioned externally adjacent to the contact nodes 108 and 109 respectively and are attached to the wall 501 of the housing 1401 exemplarily illustrated in FIG. 14. The switching node P 107 is configured to alternately contact the contact nodes 108a and 109a. The supplementary switching nodes 118a and 118b are configured to alternately connect to the supplementary contact nodes 108b and 109b respectively. An ambient motion from the wall 501 generates a multiple degree of freedom pendulum motion in the pendulum system 200, causing the conducting rod 201 with the mass 202 of the pendulum system 200 to move in a first direction, for example, the right direction, and in a second direction, for example, the left direction, opposing the first direction to alternately connect the switching node 107 to the contact nodes 108a and 109a and/or the supplementary switching nodes 118a and 118b to the supplementary contact nodes 108b and 109b respectively, to change the induced magnetic field in the first solenoid 101 or the second solenoid 102 exemplarily illustrated in FIG. 1, and induce an electric current, for example, an alternating current in the third solenoid 103 exemplarily illustrated in FIG. 1.

In an example, when the conducting rod 201 with the mass 202 of the pendulum system 200 moves in a right direction, the switching node 107 and the supplementary switching nodes 118a and 118b move towards the left. In this example, the switching node 107 contacts the supplementary contact node 108a, or the supplementary switching node 118a contacts the supplementary contact node 108b, or both the switching node 107 and the supplementary switching node 118a contact the supplementary contact nodes 108a and 108b simultaneously. In another example, when the conducting rod 201 with the mass 202 of the pendulum system 200 moves in a left direction, the switching node 107 and the supplementary switching nodes 118a and 118b move towards the right. In this example, the switching node 107 contacts the supplementary contact node 109a, or the supplementary switching node 118b contacts the supplementary contact node 109b, or both the switching node 107 and the supplementary switching node 118b contact the supplementary contact nodes 109a and 109b simultaneously. This embodiment of the second switching system 106 increases the possibility of contact of the switching node 107 to the supplementary contact nodes 108a and 109a, and contact of the supplementary switching nodes 118a and 118b to the supplementary contact nodes 108b and 109b respectively, thereby increasing the efficiency of the dynamic system 100 exemplarily illustrated in FIG. 14.

FIG. 14 exemplarily illustrates a front elevation view of an embodiment of the dynamic system 100, showing a control system 119, an electric system 117, and the second switching system 106 comprising supplementary switching nodes 118a and 118b, supplementary contact nodes 108, 108a and 109a, 109b, and the pendulum system 200 enclosed in a housing 1401. The control system 119 is operably connected to the first switch 105 exemplarily illustrated in FIG. 1, for controlling the first switch 105. In an embodiment, the control system 119 comprises a magnetic motor (not shown) and control elements 119a for controlling the movement of the first switch 105 in the electric system 117. The control elements 119a are configured, for example, as buttons that open or close the first switch 105. In an embodiment, the control elements 119a control, for example, the first switch 105 that affects the induced magnetic field in the first solenoid 101 and the second solenoid 102 exemplarily illustrated in FIG. 1, so that there are more switching operations per rotation, which therefore makes the third solenoid 103 move faster. In an embodiment, the housing 1401 incorporates electric grounding, thermal consideration, and vibration absorption features.

Figure 15A:
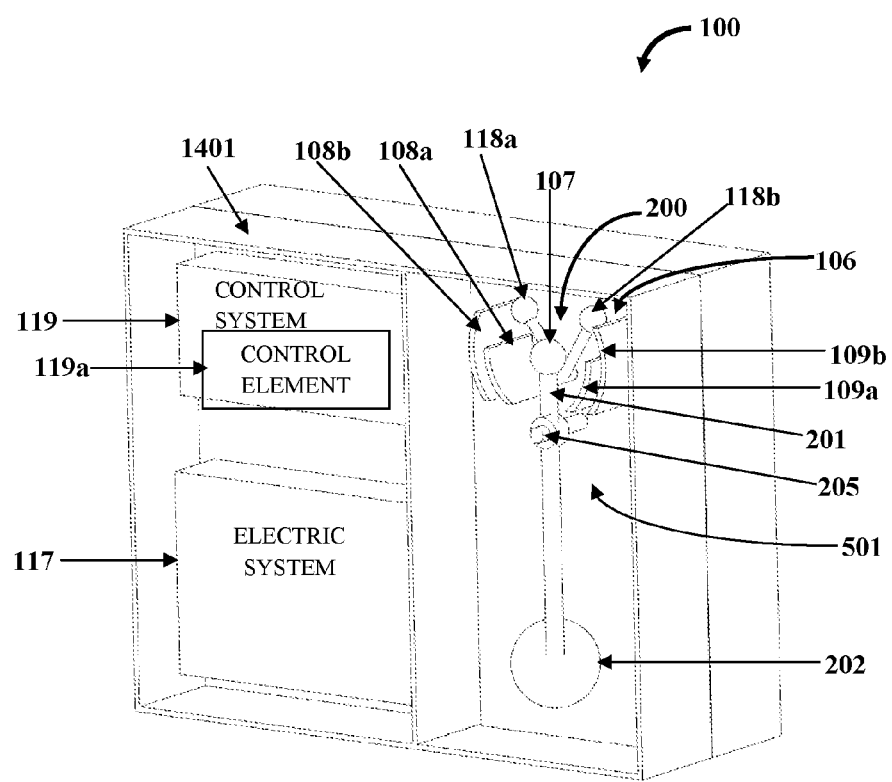
FIG. 15A exemplarily illustrates a right side perspective view of an embodiment showing multiple dynamic systems stacked for generating a cumulatively increased quantity of electrical energy.

FIG. 15A exemplarily illustrates a right side perspective view of an embodiment showing multiple dynamic systems 100a and 100b stacked for generating a cumulatively increased quantity of electrical energy.

Figure 15B:
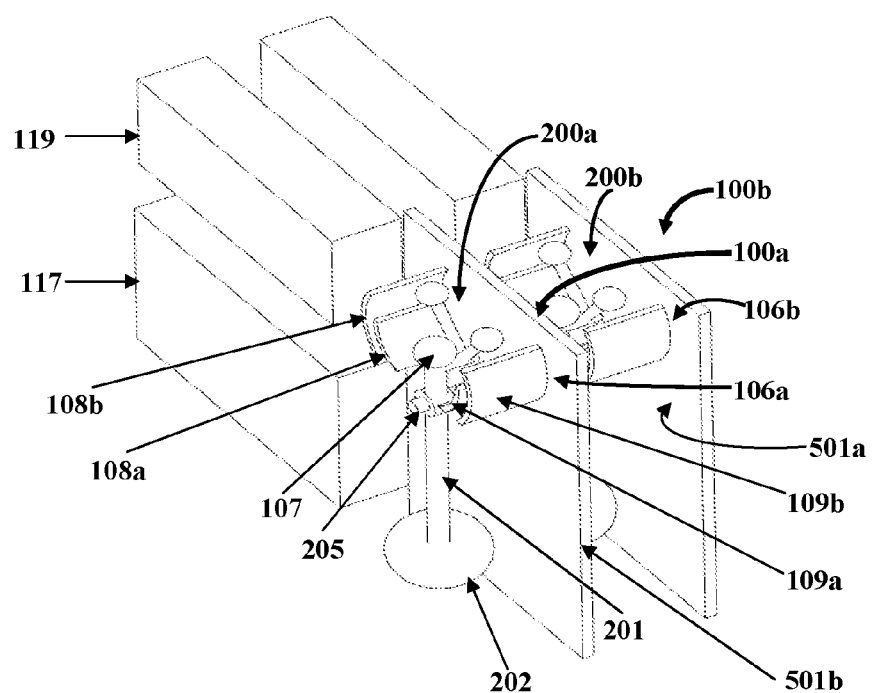
FIG. 15B exemplarily illustrates a top cutaway, perspective view of the embodiment shown in FIG. 15A, showing internal components of the stacked dynamic systems.

FIG. 15B exemplarily illustrates a top cutaway, perspective view of the embodiment shown in FIG. 15A, showing the internal components of the stacked dynamic systems 100a and 100b. As exemplarily illustrated in FIG. 15B, two dynamic systems 100a and 100b are positioned inside the housing 1401 exemplarily illustrated in FIG. 15A, each having a configuration exemplarily illustrated in FIG. 15B. The dynamic systems 100a and 100b are stacked parallel to each other to construct a high power system comprising multiple system assemblies such as control systems 119 and electric systems 117 having the solenoids 101, 102, and 103 positioned on the single iron core 104, and second switching systems 106a and 106b with multi-head pendulum systems 200a and 200b positioned on the walls 501a and 501b respectively.

Figure 16A:
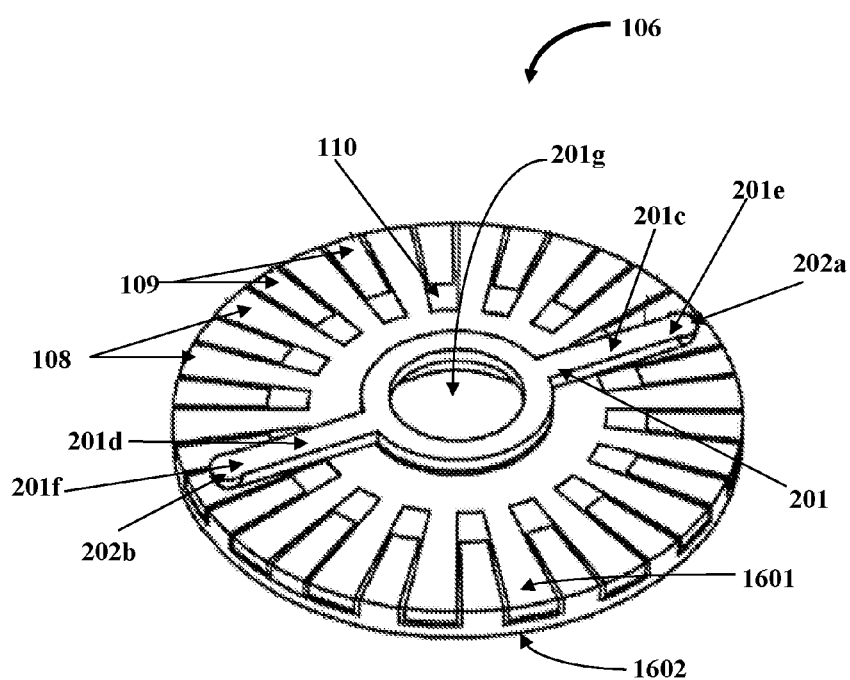
FIG. 16A exemplarily illustrates a top perspective view of an embodiment of the second switching system.

FIG. 16A exemplarily illustrates a top perspective view of an embodiment of the second switching system 106. A design of the second switching system 106 for circular motion to increase frequency is exemplarily illustrated in FIG. 16A. The frequency of movement of the second switching system 106 is increased by using a circular motion, instead of the reciprocating or pendulum motion as disclosed in the detailed description of FIGS. 7A-7C and FIGS. 9A-15B. The on/off frequency of the second switching system 106 is directly proportional to the change rate of the magnetic field and the magnitude of the generated electromotive force according to Faraday's law. In the embodiment exemplarily illustrated in FIG. 16A, the second switching system 106 comprises multiple first contact nodes 108 and multiple second contact nodes 109 that sandwich the solar cell 110. As exemplarily illustrated in FIG. 16A, the second switching system 106 comprises a first generally circular plate 1601, a second generally circular plate 1602, and a conducting rod 201.

Figure 16B:
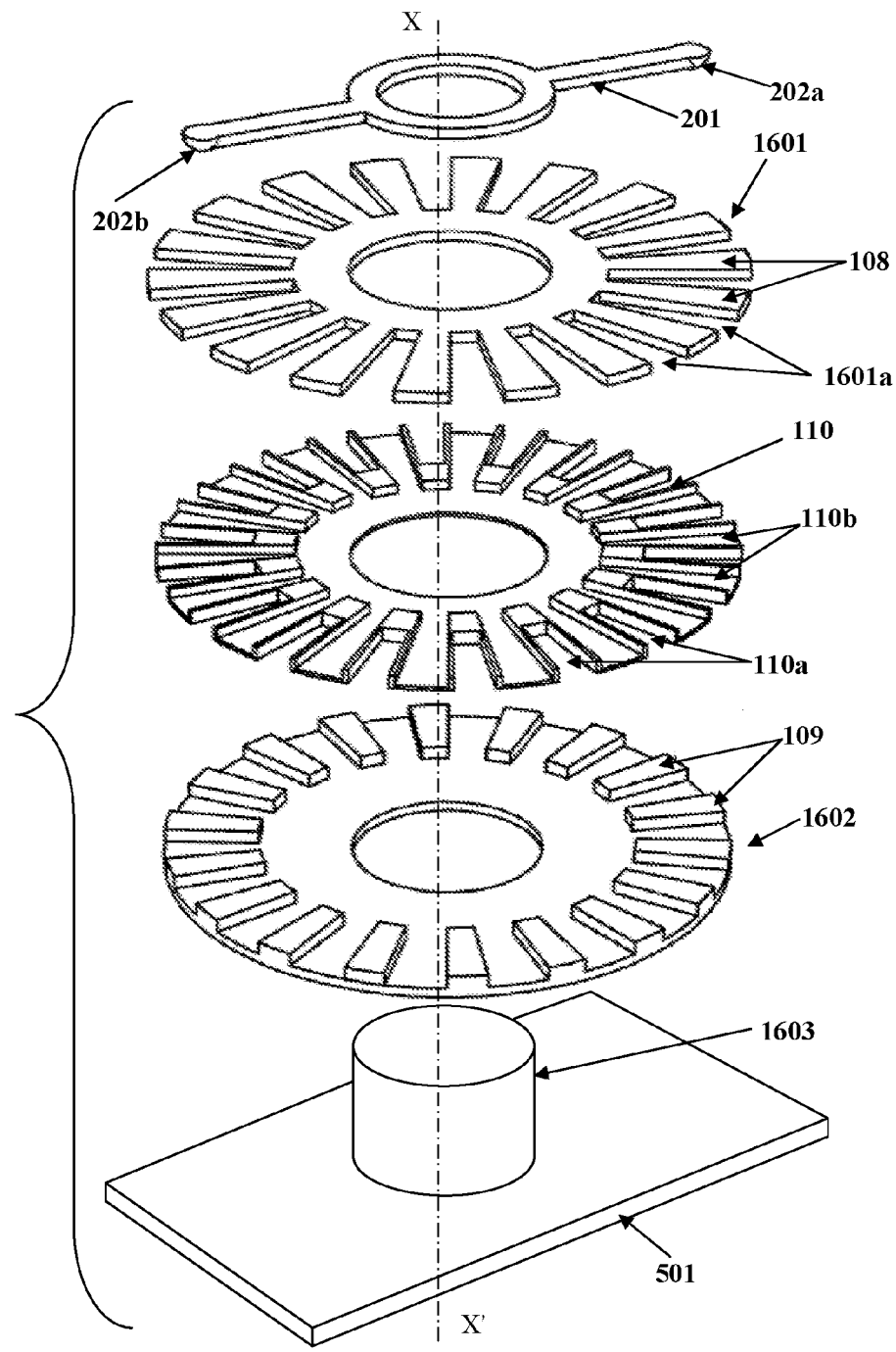
FIG. 16B exemplarily illustrates an exploded view of the embodiment of the second switching system shown in FIG. 16A.

The first generally circular plate 1601 comprises the first contact nodes 108 configured as radial projections, and radial grooves 1601a exemplarily illustrated in FIG. 16B, configured between the first contact nodes 108 for separating the first contact nodes 108 and accommodating the second contact nodes 109. The second generally circular plate 1602 is coaxially connected to the first generally circular plate 1601. The second generally circular plate 1602 comprises the second contact nodes 109 configured as radial projections to be accommodated in the radial grooves 1601a of the first generally circular plate 1601 to form an alternating arrangement of contact nodes. The conducting rod 201 is rotatably connected to a wall 501 of a housing (not shown) of the dynamic system 100 exemplarily illustrated in FIG. 1, via one or more pivot joints, for example, a shaft 1603 as exemplarily illustrated in FIGS. 16B-16C. The conducting rod 201 is coaxially positioned on the first contact nodes 108 of the first generally circular plate 1601 and the second contact nodes 109 of the second generally circular plate 1602 as exemplarily illustrated in FIG. 16A. In an embodiment, the conducting rod 201 comprises two arms 201c and 201d separated by a central section 201g. The two arms 201c and 201d of the conducting rod 201 hold dual masses 202a and 202b respectively. The masses 202a and 202b are positioned at opposing ends 201e and 201f of the conducting rod 201 as exemplarily illustrated in FIG. 16A. The masses 202a and 202b are configured as switching nodes to alternately contact the first contact nodes 108 and the second contact nodes 109.

Figure 17:
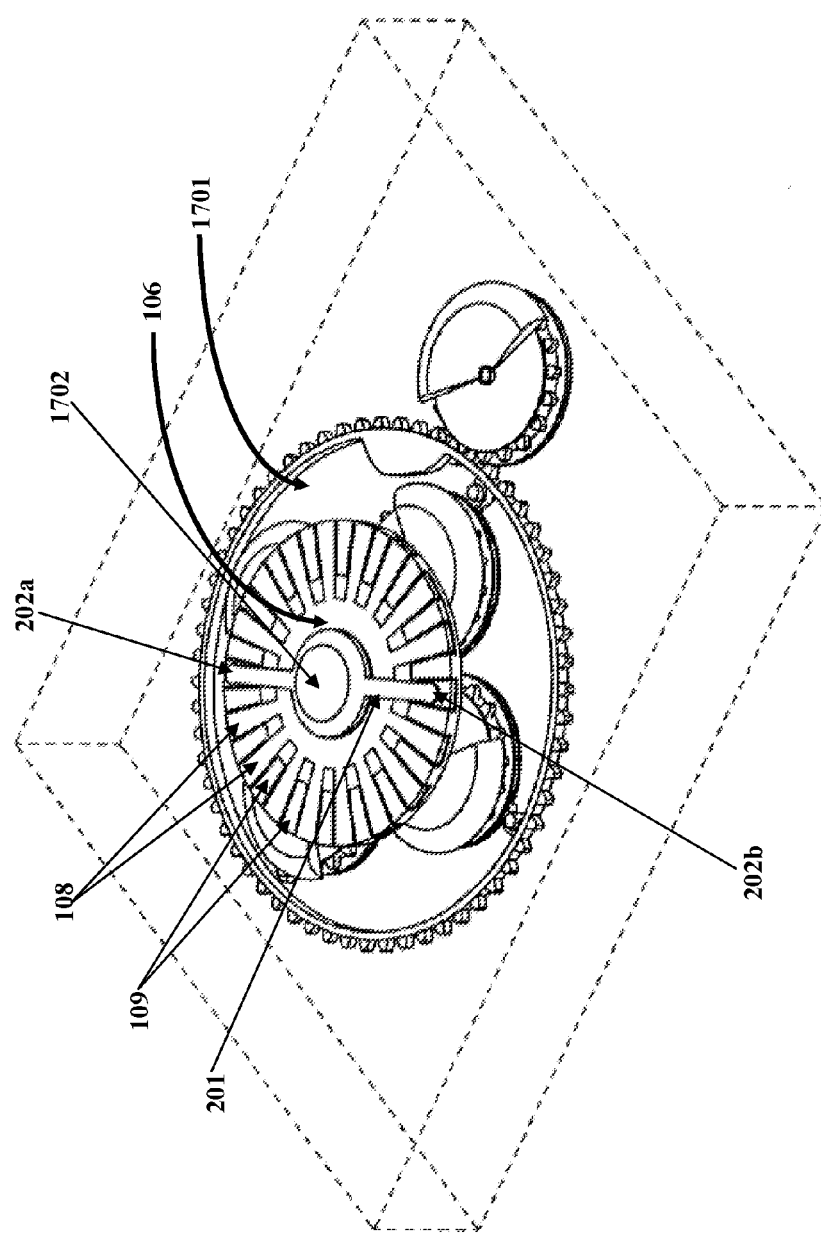
FIG. 17 exemplarily illustrates a top perspective view of an energy harvester system operably coupled to the second switching system shown in FIG. 16A.

The central section 201g of the conducting rod 201 accommodates a pivot joint, for example, the shaft 1603 for connecting the second switching system 106 to the wall 501 or to an external energy harvester system 1701 exemplarily illustrated in FIG. 17. A mechanical motion, for example, an ambient motion from the wall 501 generates a circular motion, or a partially circular motion, or a substantially circular motion in the conducting rod 201, causing the conducting rod 201 to alternately connect the two masses 202a and 202b configured as switching nodes to the first contact nodes 108 or the second contact nodes 109.

FIG. 16B exemplarily illustrates an exploded view of the embodiment of the second switching system 106 shown in FIG. 16A. The solar cell 110 with radial openings 110a and radial grooves 110b is positioned on the second generally circular plate 1602 containing the second contact nodes 109. The radial openings 110a of the solar cell 110 accommodate the second contact nodes 109 therewithin. The first generally circular plate 1601 containing the first contact nodes 108 is then positioned on the solar cell 110. The radial grooves 110b of the solar cell 110 accommodate the first contact nodes 108 therewithin. The conducting rod 201 comprising the dual masses 202a and 202b configured as switching nodes is then positioned on the first generally circular plate 1601 containing the first contact nodes 108. The dual masses 202a and 202b configured as the switching nodes alternately contact the first contact nodes 108 and the second contact nodes 109 in a circular motion, or a partially circular motion, or a substantially circular motion. The conducting rod 201, the first generally circular plate 1601, the solar cell 110, and the second generally circular plate 1602 are collectively mounted on the pivot joint, for example, the shaft 1603 positioned on the wall 501 of a housing (not shown) of the dynamic system 100 exemplarily illustrated in FIG. 1. The conducting rod 201, the first generally circular plate 1601, the solar cell 110, and the second generally circular plate 1602 are coaxially connected to each other about an axis XX'.

Figure 16C:
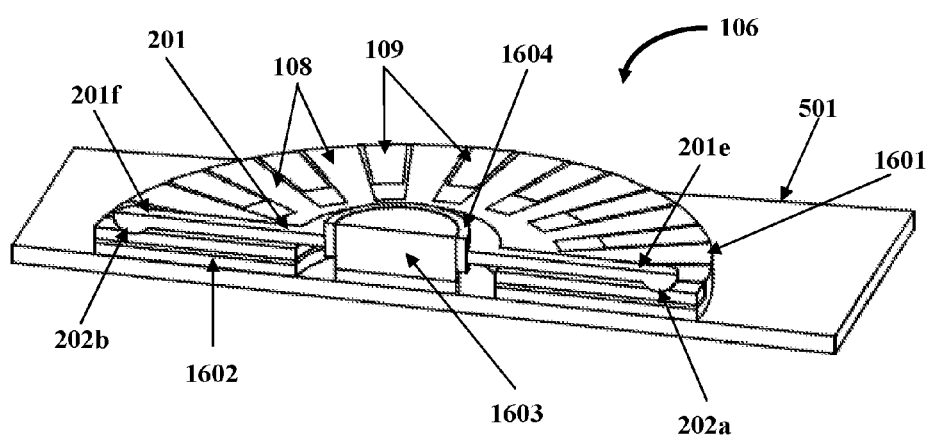
FIG. 16C exemplarily illustrates a top perspective, sectional view of the embodiment of the second switching system 106 shown in FIG. 16A.

FIG. 16C exemplarily illustrates a top perspective, sectional view of the embodiment of the second switching system 106 shown in FIG. 16A. In this embodiment, second switching system 106 comprising the first generally circular plate 1601, the second generally circular plate 1602, and the conducting rod 201 is mounted on a pivot joint, for example, a shaft 1603 extending from the wall 501 of the housing (not shown). The conducting rod 201 is free to move in a clockwise direction or a counterclockwise direction about the shaft 1603. The two ends 201e and 201f of the conducting rod 201 hold masses 202a and 202b respectively, configured as switching nodes. These masses 202a and 202b configured as switching nodes simultaneously contact either the first contact nodes 108 or the second contact nodes 109 depending on the position of the conducting rod 201. In an embodiment, to separate an electric circuit defined by the connection of the masses 202a and 202b to the first contact nodes 108 from the electric circuit defined by the connection of the masses 202a and 202b to the second contact nodes 109, the wall 501 is insulated using an insulating material, for example, rubber, plastic, the ULTEM® resin 1000, Teflon®, etc. In an embodiment, an insulation pad 1604 is positioned around the shaft 1603 to separate the electric circuitry.

FIG. 17 exemplarily illustrates a top perspective view of an energy harvester system 1701 operably coupled to the second switching system 106 shown in FIG. 16A. The energy harvester system 1701 generates rotational motion as disclosed in the co-pending patent application Ser. No. 14/854,295 titled "Energy Harvester System" filed in the United States Patent and Trademark Office on Sep. 15, 2015, and provides the rotational motion to the second switching system 106 to activate the second switching system 106 for generation of electricity. When a central gear 1702 of the energy harvester system 1701 rotates, the conducting rod 201 with the dual masses 202a and 202b configured as switching nodes alternately connects to the first contact nodes 108 or the second contact nodes 109 to change the induced magnetic field in the first solenoid 101 or the second solenoid 102 exemplarily illustrated in FIG. 1, and induce an electric current, for example, an alternating current in the third solenoid 103 exemplarily illustrated in FIG. 1.

Figure 18A:
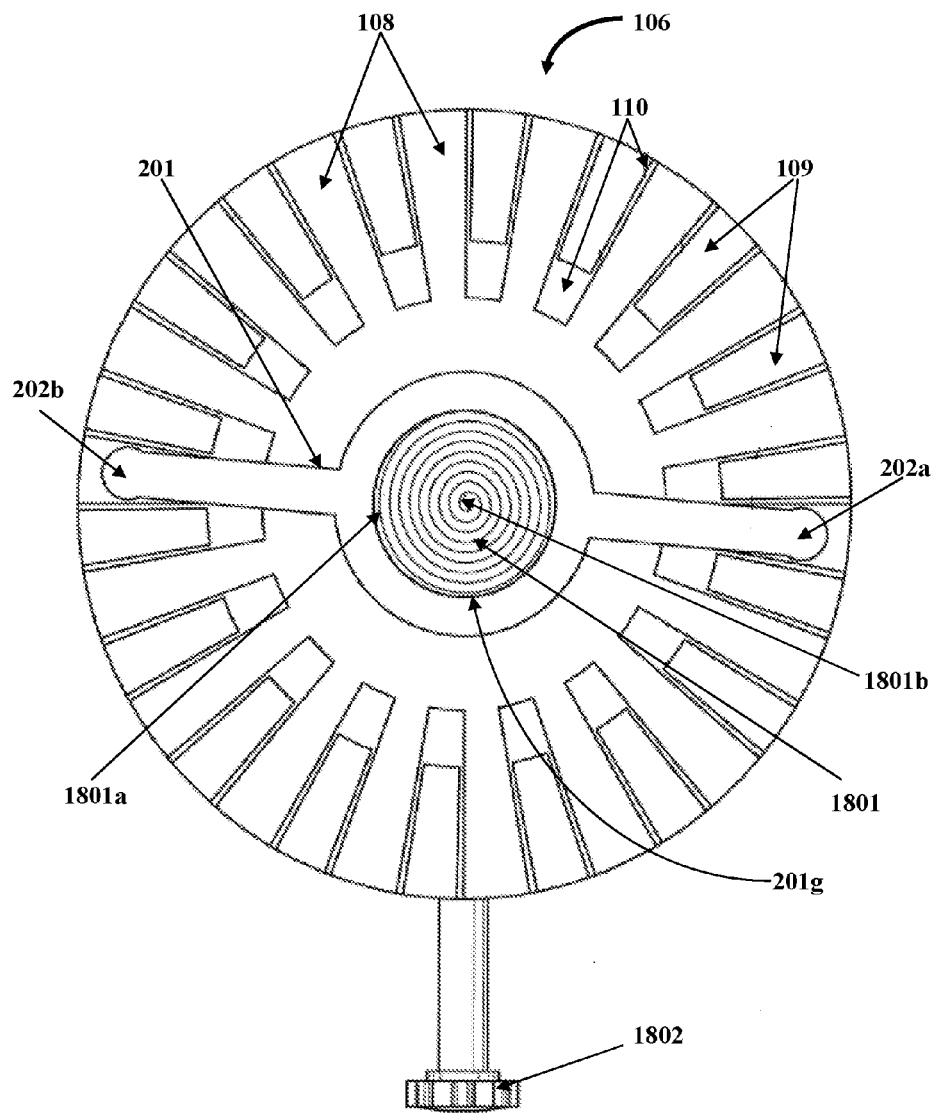
FIG. 18A exemplarily illustrate a top plan view of an embodiment of the second switching system.
Figure 18B:
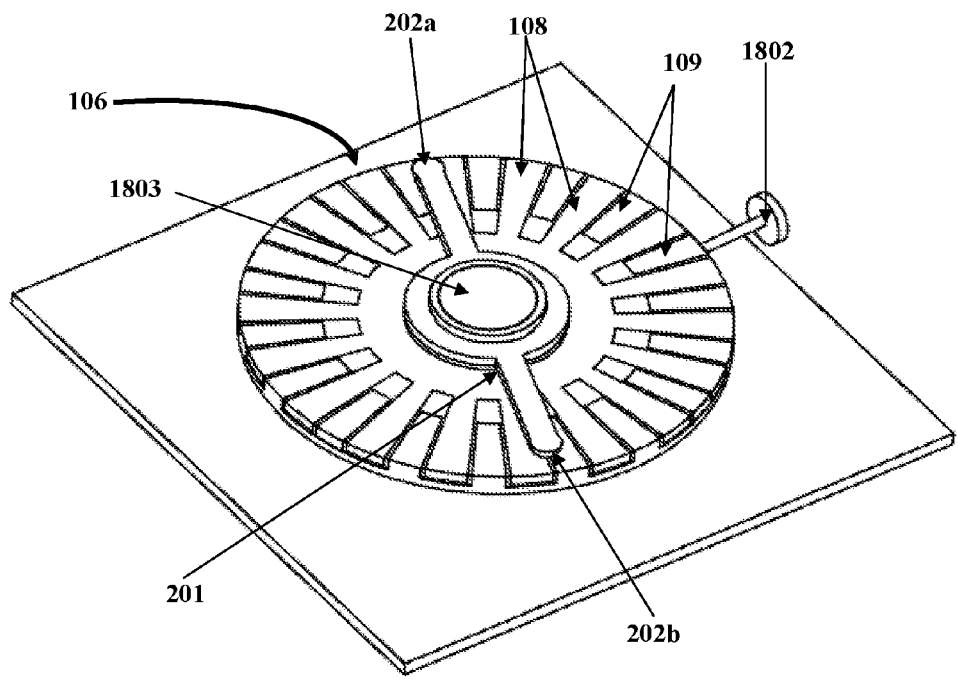
FIG. 18B exemplarily illustrates a top perspective view of the embodiment of the second switching system shown in FIG. 18A.

FIGS. 18A-18B exemplarily illustrate a top plan view and a top perspective view of an embodiment of the second switching system 106 respectively. The embodiment exemplarily illustrated in FIGS. 18A-19B shows a hand operated second switching system 106. In this embodiment, the second switching system 106 further comprises a spring element 1801 positioned at a generally central section 201g of the conducting rod 201. A first end 1801a of the spring element 1801 is operably connected to a rotatable component, for example, a geared casing 1804 exemplarily illustrated in FIG. 18C, positioned on the wall 501 of a housing (not shown) of the dynamic system 100 exemplarily illustrated in FIG. 1. A second end 1801b of the spring element 1801 is connected to a pivot, for example, a shaft 1803 exemplarily illustrated in FIGS. 18B-18C. The spring element 1801 is wound manually generating the mechanical motion that initiates a circular motion, or a partially circular motion, or a substantially circular motion in the conducting rod 201, causing the conducting rod 201 to alternately connect the two masses 202a and 202b configured as switching nodes to the first contact nodes 108 or the second contact nodes 109. To separate an electric circuit defined by the connection of the masses 202a and 202b to the first contact nodes 108 from the electric circuit defined by the connection of the masses 202a and 202b to the second contact nodes 109, the wall 501 is insulated using an insulating material, for example, rubber, plastic, the ULTEM® resin 1000, Teflon®, etc. A user manually operates the handle 1802, which in turn tightens the spring element 1801. The working of the handle 1802 and the spring element 1801 is similar to the tightening of the mainspring of a wristwatch. The unwound spring element 1801 moves the masses 202a and 202b positioned on the conducting rod 201 and configured as switching nodes to alternately connect to the first contact nodes 108 or the second contact nodes 109. This embodiment is used, for example, when there is insufficient circular motion of the conducting rod 201 generated by the ambient motion of the housing of the dynamic system 100.

Figure 18C:
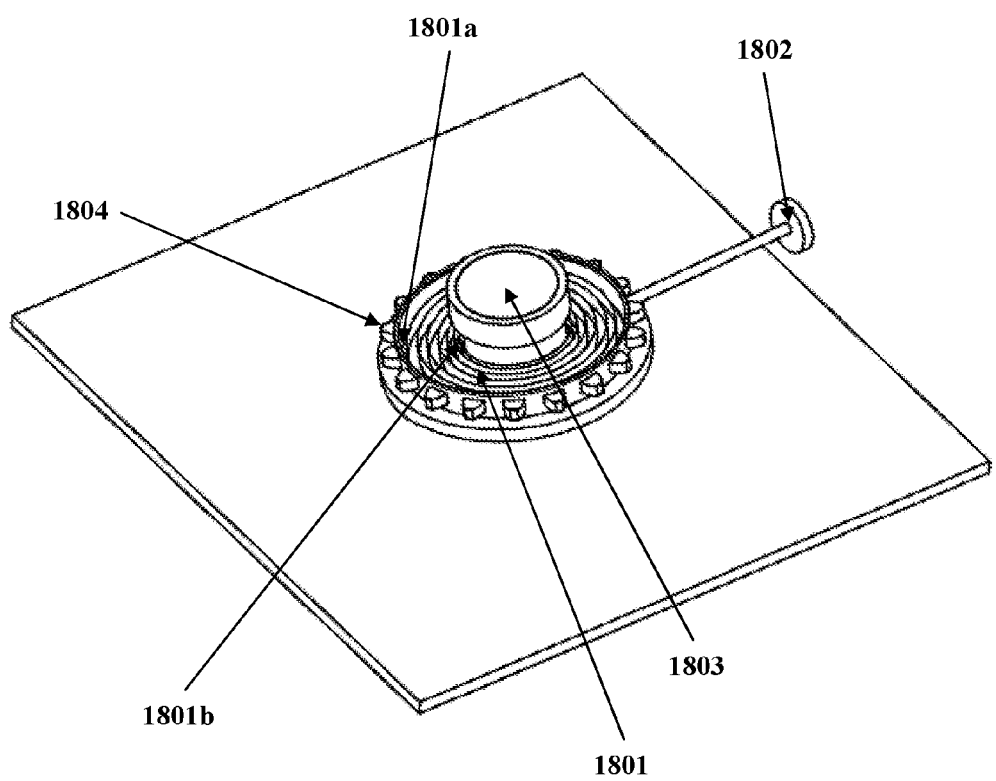
FIG. 18C exemplarily illustrates top cutaway, perspective view, showing a spring element wound about a pivot in the embodiment of the second switching system shown in FIGS. 18A-18B.

FIG. 18C exemplarily illustrates top cutaway, perspective view, showing the spring element 1801 wound about a pivot, for example, a shaft 1803 in the embodiment of the second switching system 106 shown in FIGS. 18A-18B. In this embodiment, the second switching system 106 is mounted on the shaft 1803. The first end 1801a of the spring element 1801 is connected to the geared casing 1804 and the second end 1801b of the spring element 1801 is connected to the shaft 1803. When a user manually rotates the handle 1802, the geared casing 1804 rotates. The rotation of the geared casing 1804 tightens the spring element 1801. When the spring element 1801 is released or unwound, the shaft 1803 rotates due to the energy stored in the spring element 1801. The rotation of the shaft 1803 causes the conducting rod 201 of the second switching system 106 to rotate, for example, in a circular motion, or a partially circular motion, or a substantially circular motion, thereby allowing the masses 202*a* and 202*b* positioned on the conducting rod 201 to alternately contacts either the first contact nodes 108 or the second contact nodes 109 of the second switching system 106 exemplarily illustrated in FIGS. 18A-18B.

Figure 19:
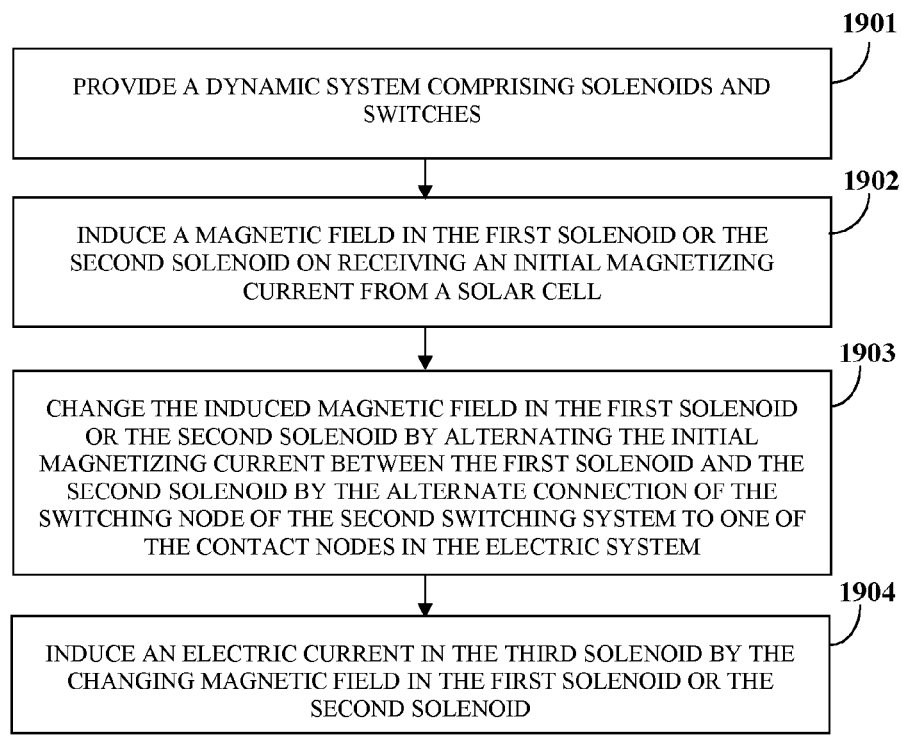
FIG. 19 illustrates a method for generating electricity from a changing magnetic field.

FIG. 19 illustrates a method for generating electricity from a changing magnetic field. The dynamic system 100 comprising multiple solenoids 101, 102, and 103 and switches 105 and 106 as exemplarily illustrated in FIG. 1 and as disclosed in the detailed description of FIG. 1, is provided 1901. In the method disclosed herein, a magnetic field is induced 1902 by the first solenoid 101 or the second solenoid 102 on receiving an initial magnetizing current from the solar cell 110. The source of the initial magnetizing current is connected to the capacitor 113 in the electric system 117 exemplarily illustrated in FIG. 1, when a predefined amount of charge is generated on the capacitor 113. When the first switch 105 is closed, the resistor 111 exemplarily illustrated in FIG. 1, is connected to the first solenoid 101 and the second solenoid 102. The capacitor 113 provides the magnetizing current. Alternating the initial magnetizing current between the first solenoid 101 and the second solenoid 102 by the alternate connection of the switching node 107 of the second switching system 106 to one of the two contact nodes 108 and 109 in the electric system 117 changes 1903 the induced magnetic field in the first solenoid 101 or the second solenoid 102. The changing magnetic field induces 1904 an electric current, for example, an alternating current in the third solenoid 103. The dynamic system 100 disclosed herein collects an ambient motion energy to power electronic devices. In an embodiment, the dynamic system 100 is a direct current (DC) generator capable of generating power of, for example, about 100 mW to about 150 mW. The recorded output voltage is, for example, about 6V at its peak, though the frequency is not high and the pulse is brief. The energy for alternating the electric current comes from a built-in motion energy harvester.

Figure 20:
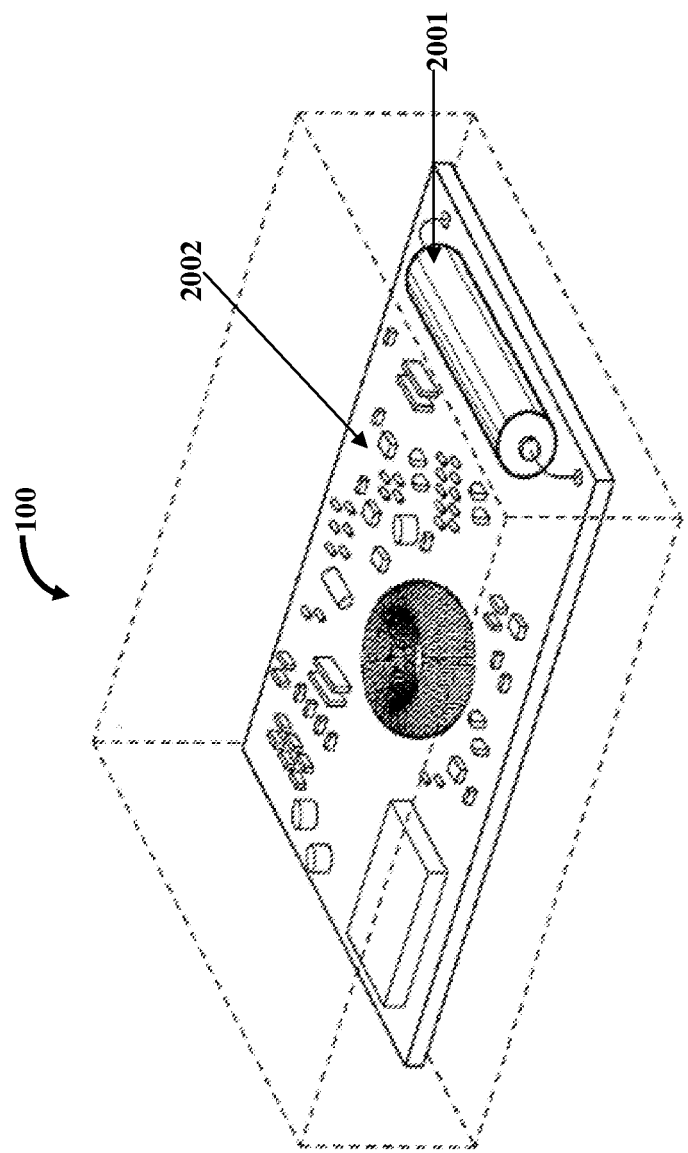
FIG. 20 exemplarily illustrates a top perspective view of an experimental setup of the dynamic system.

FIG. 20 exemplarily illustrates a top perspective view of an experimental setup of the dynamic system 100, where the solar cell 110 exemplarily illustrated in FIG. 1, is replaced with an AA battery 2001 on a printed circuit board 2002. In this experimental setup, a rectifier is used to convert the alternating current generated in the third solenoid 103 exemplarily illustrated in FIG. 1, to a direct current. An AA rechargeable battery 2001 of, for example, 1.2 Volts is used instead of the solar cell 110 to provide the magnetizing current. The printed circuit board 2002 housing the dynamic system 100 is exemplarily illustrated in FIG. 20. To test the dynamic system 100, an oscilloscope is directly connected to the direct current output. The printed circuit board 2002 generates an output pulse of, for example, about 6 Volt. In an embodiment, the dynamic system 100 can be housed in a portable electrical box with a size less than, for example, about 2×6×10 cm$^3$ and a mass less than, for example, 300 grams, capable of delivering, for example, about 100 mW to about 150 mW of power.

Figure 21:
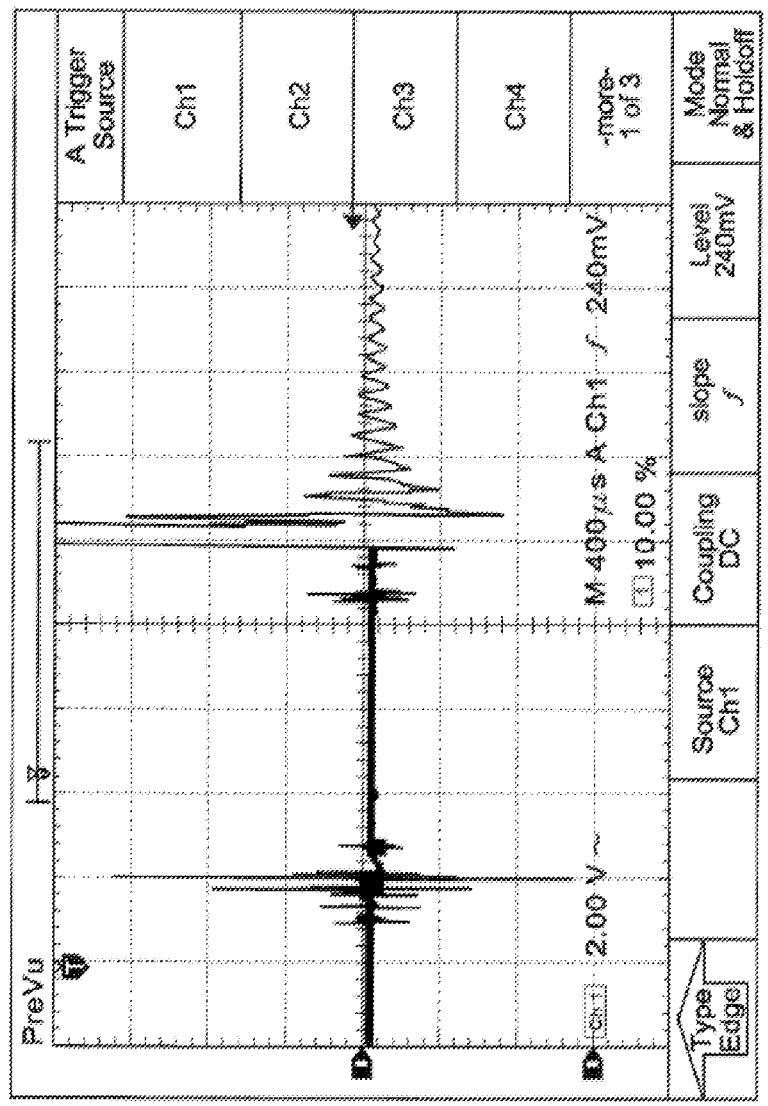
FIG. 21 exemplarily illustrates a graphical representation of a test result showing a direct current voltage output of the dynamic system.

FIG. 21 exemplarily illustrates a graphical representation of a test result showing a direct current (DC) voltage output of the dynamic system 100 exemplarily illustrated in FIG. 1. The calculation of the (DC) output voltage is disclosed in the detailed description of FIG. 1. The dynamic system 100 housed on the whole printed circuit board 2002 exemplarily illustrated in FIG. 20, generates an output pulse of, for example, about 6 V as exemplarily illustrated in FIG. 21. The 6V pulse shows that the dynamic system 100 is sound.

The foregoing examples have been provided merely for the purpose of explanation and are in no way to be construed as limiting of the dynamic system 100 exemplarily illustrated in FIG. 1, and the method disclosed herein. While the dynamic system 100 and the method have been described with reference to various embodiments, it is understood that the words, which have been used herein, are words of description and illustration, rather than words of limitation. Further, although the dynamic system 100 and the method have been described herein with reference to particular means, materials, and embodiments, the dynamic system 100 and the method are not intended to be limited to the particulars disclosed herein; rather, the dynamic system 100 and the method extend to all functionally equivalent structures, methods and uses, such as are within the scope of the appended claims. Those skilled in the art, having the benefit of the teachings of this specification, may effect numerous modifications thereto and changes may be made without departing from the scope and spirit of the dynamic system 100 and the method disclosed herein in their aspects.

We claim:

1. A dynamic system for generating electricity from a changing magnetic field, the dynamic system comprising:
   a plurality of solenoids routed on a single iron core, the solenoids comprising a first solenoid, a second solenoid, and a third solenoid, wherein the first solenoid and the second solenoid are stationary electromagnet coils opposably routed on the single iron core and configured to induce opposing magnetic fields on receiving an initial magnetizing current from a solar cell electrically connected to the first solenoid and the second solenoid in an electric system, and wherein the third solenoid is a stationary electric current induction coil routed on the single iron core; and
   switches operably connected to the solenoids in the electric system, the switches comprising:
      a first switch operably connected to the solar cell and a resistor in the electric system, wherein the first switch disconnects from the solar cell and connects to the resistor after the initial magnetizing current is supplied to the first solenoid and the second solenoid; and
      a second switching system configured to alternately connect at least one switching node to one of at least two contact nodes in the electric system to form a closed electric system with one of the first solenoid and the second solenoid, the solar cell, and a load, and to change a magnetic field induced in the one of the first solenoid and the second solenoid by alternating the initial magnetizing current between the first solenoid and the second solenoid, wherein the changing magnetic field induces an electric current in the third solenoid.

2. The dynamic system of claim 1, wherein the second switching system comprises a pendulum system, the pendulum system comprising a conducting rod and a mass, wherein the conducting rod of the pendulum system extends from the at least one switching node and is rotatably connected to a housing of the dynamic system via one or more pivot joints, and wherein the mass of the pendulum system is rigidly connected to a distal end of the conducting rod, and wherein an ambient motion from the housing generates a multiple degree of freedom pendulum motion in the pendulum system, causing the conducting rod with the mass of the pendulum system to move in a first direction and a second direction opposing the first direction to alternately connect the at least one switching node to the one of the at least two contact nodes attached to the housing of the dynamic system.

3. The dynamic system of claim 2, wherein the one or more pivot joints are configured as ball joints applied with a coating, wherein each of the ball joints comprises a socket configured with multiple cuts to reduce weight of the each of the ball joints and to increase a range of the multiple degree of freedom pendulum motion in the pendulum system.

4. The dynamic system of claim 2, wherein the one or more pivot joints comprise a pivot pin rigidly connected to the housing of the dynamic system, and wherein the conducting rod of the pendulum system is configured to rotate about the pivot pin.

5. The dynamic system of claim 2, wherein the one or more pivot joints are one of pin joints, spherical joints, coated joints, and plated joints.

6. The dynamic system of claim 2, wherein the pendulum system further comprises supplementary switching nodes connected to an upper end of the conducting rod and proximal to the at least one switching node, wherein each of the supplementary switching nodes is configured to alternately connect to supplementary contact nodes positioned externally adjacent to the at least two contact nodes and attached to the housing of the dynamic system.

7. The dynamic system of claim 1 configured to be stacked with another one or more dynamic systems comprising the solenoids, the switches, and control systems for generating a cumulatively increased quantity of electrical energy from the induced electric current.

8. The dynamic system of claim 1, wherein the at least two contact nodes comprise a plurality of first contact nodes and a plurality of second contact nodes, and wherein the second switching system comprises:
   a first generally circular plate comprising the first contact nodes configured as radial projections, and radial grooves configured between the first contact nodes for separating the first contact nodes and accommodating the second contact nodes;
   a second generally circular plate coaxially connected to the first generally circular plate, the second generally circular plate comprising the second contact nodes configured as radial projections to be accommodated in the radial grooves of the first generally circular plate to form an alternating arrangement of contact nodes;
   a conducting rod rotatably connected to a housing of the dynamic system via one or more pivot joints and coaxially positioned on the at least two contact nodes of the first generally circular plate and the second generally circular plate; and
   at least two masses positioned at opposing ends of the conducting rod, wherein each of the at least two masses is configured as the at least one switching node, and wherein a mechanical motion generates one of a circular motion, a partially circular motion, and a substantially circular motion in the conducting rod, causing the conducting rod to alternately connect the each of the at least two masses configured as the at least one switching node to one of the first contact nodes and the second contact nodes.

9. The dynamic system of claim 8, wherein the mechanical motion is an ambient motion from the housing that generates the one of the circular motion, the partially circular motion, and the substantially circular motion in the conducting rod, causing the conducting rod to alternately connect the each of the at least two masses configured as the at least one switching node to the one of the first contact nodes and the second contact nodes.

10. The dynamic system of claim 8, wherein the second switching system further comprises a spring element positioned at a generally central section of the conducting rod, wherein a first end of the spring element is operably connected to rotatable component positioned on the housing of the dynamic system, and a second end of the spring element is connected to the housing of the dynamic system via a pivot, and wherein the spring element is wound manually for generating the mechanical motion that initiates the one of the circular motion, the partially circular motion, and the substantially circular motion in the conducting rod, causing the conducting rod to alternately connect the each of the at least two masses configured as the at least one switching node to the one of the first contact nodes and the second contact nodes.

11. The dynamic system of claim 1, wherein wires of the first solenoid and the second solenoid are routed in opposing directions for inducing the opposing magnetic fields.

12. The dynamic system of claim 1, wherein the single iron core is configured in a toroid shape without an air gap to provide a magnetic path of least magnetic resistance.

13. The dynamic system of claim 1, further comprising a plurality of diodes operably connected within the electric system, wherein the diodes are electrically connected to the load through a capacitor and an inductor, and wherein the diodes convert an alternating current induced in the third solenoid into a direct current.

14. The dynamic system of claim 13, wherein the capacitor and the inductor electrically connected to the diodes reduce a current ripple.

15. The dynamic system of claim 13, wherein a source of the initial magnetizing current is connected to the capacitor in the electric system when a predefined amount of charge is generated on the capacitor.

16. The dynamic system of claim 1, further comprising a control system operably connected to the switches, wherein the control system comprises control elements for controlling the switches that affect the induced magnetic field in the first solenoid and the second solenoid and the induced electric current in the third solenoid.

17. The dynamic system of claim 1, wherein each of the at least two contact nodes is configured in one of a partial cylindrical shape, a partial spherical shape, and a generally curved plate shape.

18. The dynamic system of claim 1, wherein each of the at least two contact nodes and the at least one switching node are coated with a shielding material for reducing contact resistance of the each of the at least two contact nodes and the at least one switching node.

19. A dynamic system for generating electricity from a changing magnetic field, the dynamic system comprising:
   a control system and an electric system;
   said electric system comprising:
      a plurality of solenoids routed on a single iron core, the solenoids comprising a first solenoid, a second solenoid, and a third solenoid, wherein the first solenoid and the second solenoid are stationary electromagnet coils opposably routed on the single iron core, wherein the first solenoid and the second solenoid are configured to induce opposing magnetic fields on receiving an initial magnetizing current from a solar cell electrically connected to the first solenoid and the second solenoid in said electric system, and wherein the third solenoid is a stationary electric current induction coil routed on the single iron core; and switches operably connected to the solenoids in the electric system, the switches comprising:
- a first switch operably connected to the solar cell and a resistor in the electric system, wherein the first switch disconnects from the solar cell and connects to the resistor after the initial magnetizing current is supplied to the first solenoid and the second solenoid; and
- a second switching system comprising at least one switching node, at least two contact nodes, and a pendulum system, wherein said second switching system is configured to alternately connect at least one switching node to one of at least two contact nodes in the electric system to form a closed electric system with one of the first solenoid and the second solenoid, the solar cell, and a load, wherein said second switching system is further configured to change a magnetic field induced in the one of the first solenoid and the second solenoid by alternating the initial magnetizing current between the first solenoid and the second solenoid, and wherein the changing magnetic field induces an electric current in the third solenoid; and said control system operably connected to the switches, wherein the control system comprises control elements for controlling the switches that affect the induced magnetic field in the first solenoid and the second solenoid and the induced electric current in the third solenoid.

20. The dynamic system of claim 19, wherein the pendulum system comprises a conducting rod and a mass, wherein the conducting rod of the pendulum system extends from the at least one switching node and is rotatably connected to a housing of the dynamic system via one or more pivot joints, and wherein the mass of the pendulum system is rigidly connected to a distal end of the conducting rod, and wherein an ambient motion from the housing generates a multiple degree of freedom pendulum motion in the pendulum system, causing the conducting rod with the mass of the pendulum system to move in a first direction and a second direction opposing the first direction to alternately connect the at least one switching node to the one of the at least two contact nodes attached to the housing of the dynamic system.

* * * * *